United States Patent [19]
Suzuki et al.

[11] Patent Number: 5,621,630
[45] Date of Patent: Apr. 15, 1997

[54] POWER SOURCE APPARATUS OF IMAGE FORMING APPARATUS

[75] Inventors: Koji Suzuki, Yokohama; Hajime Motoyama; Hiroshi Saito, both of Kawasaki, all of Japan

[73] Assignee: Canon Kabushiki Kaisha, Tokyo, Japan

[21] Appl. No.: 231,488

[22] Filed: Apr. 22, 1994

[30] Foreign Application Priority Data

Apr. 26, 1993 [JP] Japan .................................. 5-099258
Dec. 15, 1993 [JP] Japan .................................. 5-315286

[51] Int. Cl.$^6$ .................................................. H02M 7/02
[52] U.S. Cl. ................................................ 363/71; 399/88
[58] Field of Search .......................... 363/71; 355/271; 307/82, 77, 83, 71

[56] References Cited

U.S. PATENT DOCUMENTS

| | | | |
|---|---|---|---|
| 4,587,604 | 5/1986 | Nerone | 363/71 |
| 4,755,850 | 7/1988 | Suzuki et al. | 355/14 |
| 4,891,572 | 1/1990 | Suzuki | 323/284 |
| 5,164,771 | 11/1992 | Suzuki et al. | 355/208 |
| 5,321,476 | 6/1994 | Gross | 355/271 |

*Primary Examiner*—Peter S. Wong
*Assistant Examiner*—Shawn Riley
*Attorney, Agent, or Firm*—Fitzpatrick, Cella, Harper & Scinto

[57] ABSTRACT

A power source apparatus suitable for a high voltage power source of an electrophotographic type copying apparatus or a printer comprises: a first DC power source which can vary an output; a second DC power source which can vary an output and whose output terminal of the same polarity as that of one output terminal of the first DC power source is connected to such one output terminal; connecting means for connecting another output terminal of the first DC power source and another output terminal of the second DC power source to a load; control means for making operative and controlling the first and second DC power sources in accordance with an output of the power source apparatus; and detecting means for detecting an output voltage or an output current of the power source apparatus.

23 Claims, 24 Drawing Sheets

$$I_c = \frac{dV_c}{dt}$$

(Vc : TERMINAL VOLTAGE OF FLOATING CAPACITY C)

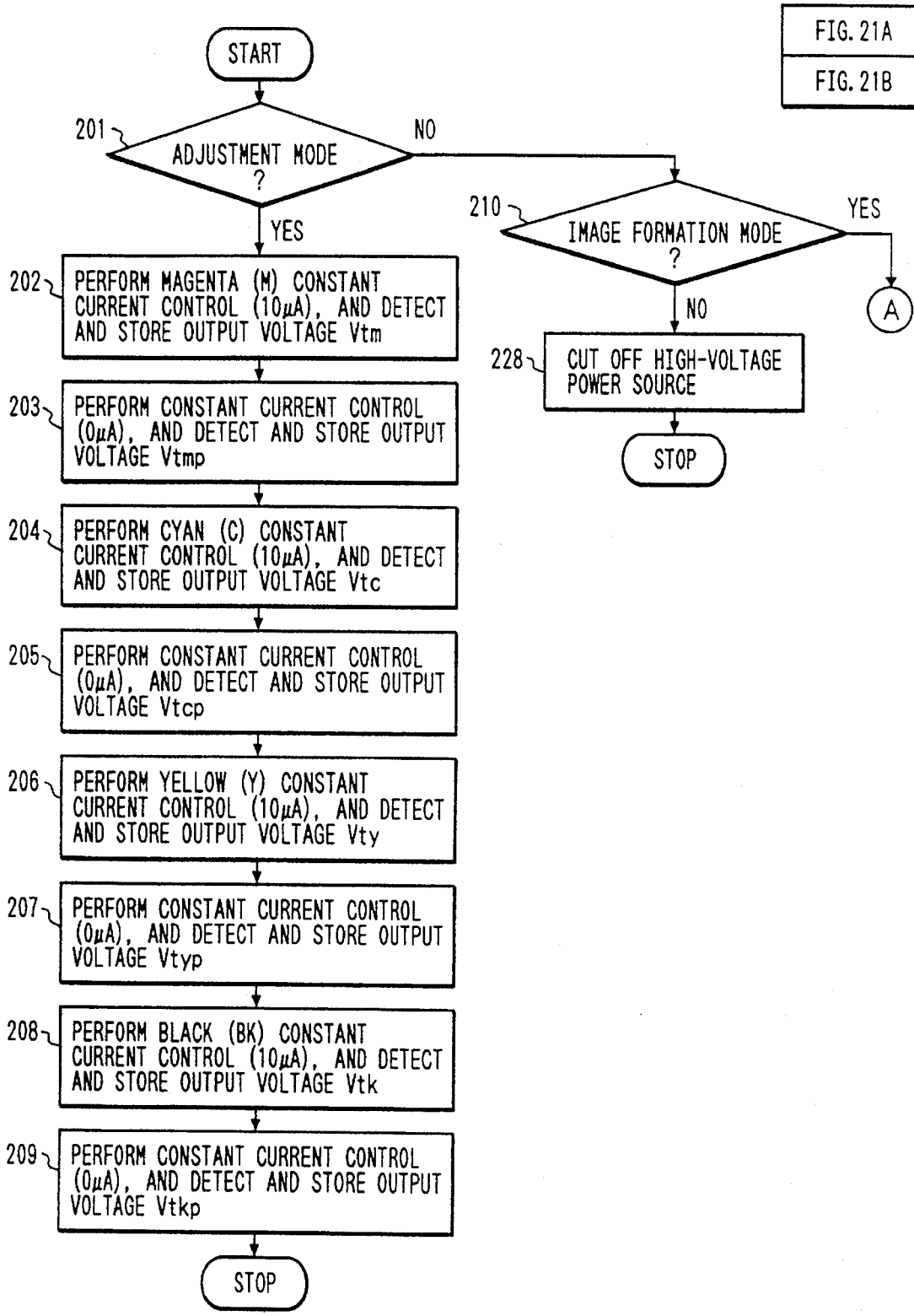

POWER SOURCE APPARATUS OF IMAGE FORMING APPARATUS

BACKGROUND OF THE INVENTION

1. Field of the Invention

The invention relates to a power source apparatus suitable for use in a high voltage power source or the like of a copying machine of the electrophotographic system or a printer.

2. Related Background Art

Hitherto, a corona charge is used in a copy transfer process to transfer a toner image on a photosensitive drum after completion of the development of a color copying machine or a color printer to a copy transfer paper. A power source is supplied to a corona wire by a constant current power source of about 6 to 9 kV and 0.1 to 1 mA.

As means for generating output voltages of both positive and negative polarities, there is generally used means such that positive and negative power sources are serially connected, the polarity side of a small output and range is set to a fixed output, an output on the opposite polarity side is made variable, thereby covering necessary positive and negative output ranges.

In recent years, the copy transfer process has again been studied in order to improve a color picture quality, and as a result a charging method has been switched from the corona charge to the contact charge.

In a contact charging system, in order to attract the toner on the photosensitive drum to the copy transfer paper, a transfer brush into contact with the back side of the transfer paper through a Mylar film and a high voltage of the polarity opposite to the polarity of the toner is applied to the transfer brush. To transfer the toners of four colors of yellow, magenta, cyan, and black onto the same copy transfer paper, the applying voltage is raised step by step as the number of transfer times increases.

Since the applying voltage for the toner of the fourth color exceeds 10 kV, an adverse influence such as a leakage or the like occurs. To prevent such an influence, the applying voltage is set to both of the positive and negative polarities, thereby reducing the maximum value of the absolute value of the applying voltage into ½. Namely, before performing the copy transfer of the first color, a negative high voltage is applied to the transfer paper and a positive high voltage at the level that is almost equal to that of the negative high voltage upon starting is applied for the fourth color.

According to such output voltage generating means of the conventional apparatus as mentioned above, there are problems such that an output range of a power source on the variable output side is remarkably widened and the costs and size increase and the reliability deteriorates.

Since a transfer current essentially contributes to the copy transfer process, it is desirable to stabilize the transfer current by performing a constant current control. However, there is a problem such that a build-up time remarkably increases at the time of switching of the transfer current because of a floating capacity among the brush, transfer drum, transfer paper, and photosensitive drum.

That is, an equivalent circuit of the system when a photosensitive drum 1 is seen from a copy transfer brush 7 shown in FIG. 13 through a copy transfer drum 2 and a copy transfer paper P is expressed by a CR parallel circuit shown in FIG. 14. In FIG. 14, C denotes a floating capacity among the transfer brush 7, transfer drum 2, transfer paper P, and photosensitive drum 1. R indicates a space impedance corresponding to a micro corona current Ir flowing from the transfer brush 7 to the photosensitive drum 1, and E denotes a high voltage power source.

Although the corona current Ir obviously essentially contributes to the copy transfer, since it is impossible to separate C and R, the sum of the corona current Ir and a charge/discharge current Ic (=dVc/dt) of the floating capacity C is detected as a current. Generally, since the transfer current to be set, namely, the corona current Ir is equal to or less than tens of µA, when a change speed of the output voltage of the high voltage power source is raised upon switching of the current, the charge/discharge current Ic is equal to or less than a target value of the constant current, so that there is a problem such that a build-up time and a build-down time of the high voltage power source are limited by the charge/discharge time of the floating capacity C. Consequently, a time which is required until the corona current Ir reaches the target value is remarkably delayed. Eventually, the image formation time cannot help being increased in order to compensate such a delay time.

On the other hand, in a contact copy transfer process of a monochromatic copying machine or printer, the constant current control is executed for a non-image period of time with respect to the current supply of a copy transfer roller (or transfer brush), the applying voltage at this time is measured and stored, a predetermined numerical arithmetic operation is executed to the stored value of the applying voltage, and a voltage which is equal to the result of the arithmetic operation is supplied for an image period of time. As mentioned above, it is necessary to switch the drive mode to either one of the constant current drive mode and the constant voltage drive mode in accordance with the non-image period of time and the image period of time. Moreover, the polarities of the output differ in dependence on the non-image period and the image period.

Hitherto, the high voltage power sources of opposite polarities as variable outputs are selectively supplied as a power source for current supply in accordance with the non-image period and the image period.

In such a conventional apparatus, the output cannot be changed to the positive or negative polarity within the non-image period or the image period. Therefore, there is a case where the stable constant current control or stable constant voltage control cannot be performed in dependence on a latent image potential on the photosensitive drum or the residual charges on the transfer paper.

On the other hand, when switching between the non-image period and the image period, it is necessary to shut off one of the positive and negative high voltage power sources and to build up the other one, so that there is a drawback such that the switching time is long.

Hitherto, there has also been proposed a method whereby the polarities of a transformer of a variable output and a transformer of a fixed output are made different, thereby obtaining positive and negative variable outputs as shown in U.S. Pat. No. 5,164,771. However, since the fixed output type transformer always operates, there is a large vain operation.

Hitherto, various kinds of high voltages are used to form an image of an apparatus of the electrophotographic system. In case of using a copy transfer drum, there is a case of applying a high voltage for a copy transfer to the copy transfer drum itself. In this instance, an adsorption charging device to wrap a copy transfer paper around the copy transfer drum, a separation charging device for separating the transfer paper from the copy transfer drum, a discharging device for discharging the charges on the copy transfer drum, and the like are arranged around the copy transfer drum. Different high voltages are respectively applied to those charging devices. For this purpose, different high voltage power sources are used for the copy transfer drum and the charging devices, respectively.

The power source to produce a voltage which is applied to the copy transfer drum is controlled so as to generate the optimum voltage in accordance with the copy transfer process by the sequence control. In a manner similar to the above, the optimum voltage is also applied to each charging device in accordance with each process by the sequence control.

According to such a conventional apparatus, a voltage such that the voltage that is applied to each charging device effectively functions is a voltage corresponding to a difference between the voltage which is applied to the copy transfer drum and the voltage which is applied to each charging device. Therefore, as a voltage which is applied to each charging device, the voltage to which the voltage that is applied to the copy transfer drum was multiplexed must be produced. Consequently, there are inconveniences such that both of the circuit and the control sequence are complicated and a voltage precision cannot be easily improved.

SUMMARY OF THE INVENTION

In consideration of such conventional techniques, it is an object of the present invention to provide a power source apparatus which can accurately obtain a desired output by making a plurality of power sources operative interlockingly with one another.

An embodiment of the invention is made by addressing the problems as mentioned above and an object of the invention is to provide an image forming apparatus of the electrophotographic system in which the costs and size are not increased, the reliability doesn't deteriorate, a build-up time upon switching of a transfer current is reduced, and an image formation time doesn't increase.

According to an aspect of the invention, it is an object of the invention to provide a power source which can obtain positive and negative high voltages by performing a variable output control to both of two transformers of different polarities.

According to another aspect of the invention, there is provided a power source apparatus comprising a first DC power source which can vary an output and a second DC power source in which an output terminal of the same polarity as that of one output terminal of the first DC power source is connected to one output terminal of the first DC power source, in which another output terminal of the first DC power source and another output terminal of the second DC power source are used as output terminals of the power source apparatus, wherein the power source apparatus further has selecting and operating means for selecting and making operative one of the first and second DC power sources in accordance with an output of the power source apparatus.

With such a construction, on the basis of the output of the apparatus, one of the first and second DC power sources can be selected and operated.

According to still another aspect of the invention, there is provided a power source apparatus comprising a first DC power source which can vary an output and a second DC power source in which an output terminal of the same polarity as that of one output terminal of the first DC power source is connected to one output terminal of the first DC power source, in which another output terminal of the first DC power source and another output terminal of the second DC power source are used as output terminals of the power source apparatus, wherein the apparatus further comprises: an error amplifier or a differential amplifier for comparing an output current of the power source and a reference value; selecting and operating means for selecting and making operative one of the first and second DC power sources by using an intermediate value of an output level of the error amplifier as a threshold value; and feedback control means for supplying an output of the error amplifier to the DC power source selected by the selecting and operating means, thereby performing a feedback control.

According to the above construction, one of the first and second DC power sources is selected and operated by the output level of the error amplifier for comparing the output current of the power source apparatus and the reference value and the feedback control of the DC power source selected by the output of the error amplifier is executed.

According to a further aspect of the invention, there is provided a power source apparatus comprising a first DC power source which can vary an output and a second DC power source in which an output terminal of the same polarity as that of one output terminal of the first DC power source is connected to one output terminal of the first DC power source, in which another output terminal of the first DC power source and another output terminal of the second DC power source are used as output terminals of the power source apparatus, wherein the apparatus further comprises: a first error amplifier (or a first differential amplifier) for comparing an output current of the power source apparatus and its reference value; a second error amplifier (or a second differential amplifier) for comparing an output voltage of the power source apparatus and its reference value; selecting means for selecting one of the first and second error amplifiers; selecting and operating means for selecting and making operative one of the first and second DC power sources by using the intermediate value of an output level of the error amplifier selected by the selecting means as a threshold value; and feedback control means for supplying an output of the error amplifier selected by the selecting means to the DC power source selected by the selecting and operating means, thereby performing a feedback control.

With the above construction, one of the first and second error amplifiers is selected by the selecting means, one of the first and second DC power sources is selected and operated by the output level of the selected error amplifier, the output of the error amplifier selected by the selecting means is supplied to the DC power source which was selected and operated, and the feedback control is executed.

It is also possible to construct in a manner such that the selecting means has detecting means for detecting at least one of an overvoltage and an overcurrent of the output of the power source apparatus and the selection state is inverted by a detection output of the detecting means.

According to a further aspect of the invention, there is provided a power source apparatus comprising: a first DC power source which can vary an output; a second DC power source which can vary an output; and control means for controlling an output voltage of the second DC power source on the basis of output voltages of the first and second DC power sources and a control signal in a manner such that a differential voltage between the output voltages of the first and second DC power sources is set to a desired value.

With the above construction, the output voltage of the second DC power source is controlled on the basis of the output voltages of the first and second DC power sources and the control voltage so that a difference between the output voltages of the first and second DC power sources is equal to a desired voltage.

According to another aspect of the invention, there is provided an image forming apparatus comprising: positive and negative high voltage power sources which can vary outputs, respectively, and whose output sides are serially connected; error amplifiers for comparing detection values of an output voltage and an output current of each high voltage power source and their reference values, respectively; a switch to select outputs of the error amplifiers; and control means for storing the output voltages or output currents of the high voltage power sources at a predetermined timing and for setting the reference values on the basis of the stored values, wherein the apparatus further has a high voltage power source apparatus of the switching type which can perform a bipolarity constant voltage control and a constant current control for selectively making the positive and negative high voltage power sources operative by using the intermediate value of an output level of the error amplifier as a threshold value.

According to still another aspect of the invention, there is provided an image forming apparatus has a high voltage power source apparatus of the switching type which can execute bipolarity constant voltage control and constant current control, wherein the high voltage power source apparatus comprises: positive and negative high voltage power sources whose output sides are serially connected; a voltage detecting circuit for dividing an output voltage which is supplied from one end of the high voltage power source to a load in accordance with a predetermined ratio; a first error amplifier for comparing an output of the voltage detecting circuit and a predetermined reference voltage; a current detecting circuit interposed between the other end of the high voltage power source and the ground; a second error amplifier for comparing an output of the current detecting circuit and a predetermined reference voltage; an electronic switch for selecting either one of outputs of the first and second error amplifiers by a control signal; an inverting amplifier and a non-inverting amplifier each for amplifying a differential voltage between the output of the error amplifier selected by the electronic switch and the intermediate value of the output level of the error amplifier; a drive circuit for controlling the outputs of the positive and negative high voltage power sources in accordance with outputs of the inverting amplifier and non-inverting amplifier; a comparator for comparing the output of the error amplifier selected and the intermediate value and for selectively making the positive and negative high voltage power sources operative; an A/D converter for converting an analog output signal of the voltage detecting circuit into a digital signal; a microcomputer for storing an output signal of the A/D converter and producing reference signals for the first and second error amplifiers at predetermined sequence timings; and a D/A converter for converting the digital reference signal into the analog signal and for giving to the first and second error amplifiers as reference voltage.

With the above construction, both of the positive and negative high voltage power sources whose output sides are serially connected can vary the outputs and the currents are supplied from the high voltage power sources to loads such as transfer brush, adsorption brush, and the like. The output voltages and output currents (load currents) of the high voltage power sources are detected and the positive and negative high voltage power sources selectively operate in accordance with the detection outputs.

In case of applying the invention to such a color image forming apparatus, a transfer voltage and an adsorption voltage of each color are detected and their values are stored into a memory. When an image is actually formed, the constant voltage control is executed at initial timings at the start of the image formation and at the time of color switching by using the stored output voltage values as references.

The above and other objects and features of the present invention will become apparent from the following detailed description and the appended claims with reference to the accompanying drawings.

DETAILED DESCRIPTION OF THE PREFERRED EMBODIMENTS

Embodiments of the present invention will now be described in detail hereinbelow.

[Embodiment 1]

Figure 1:
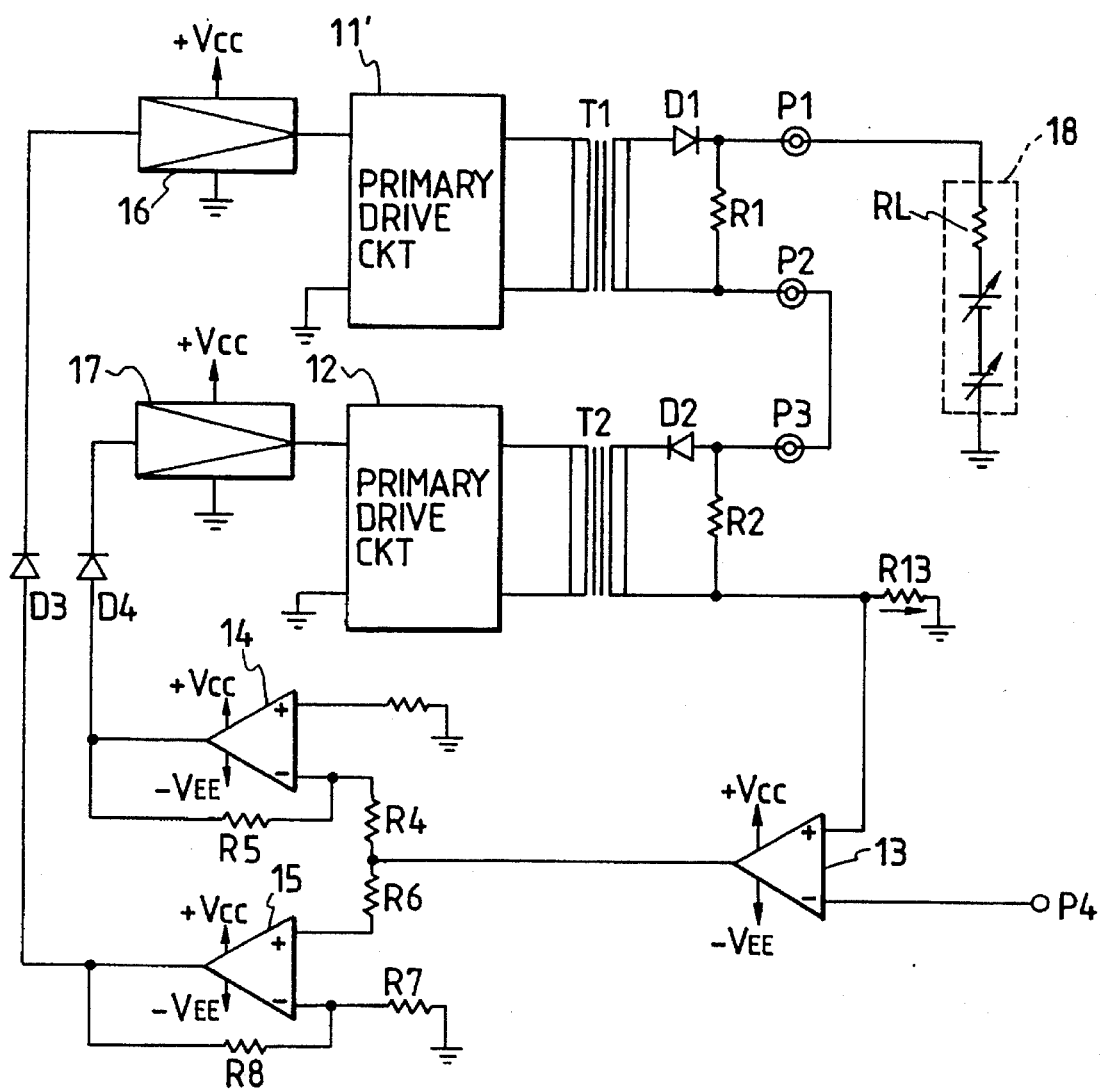
FIG. 1 is a circuit diagram of an embodiment 1.
Figure 2:
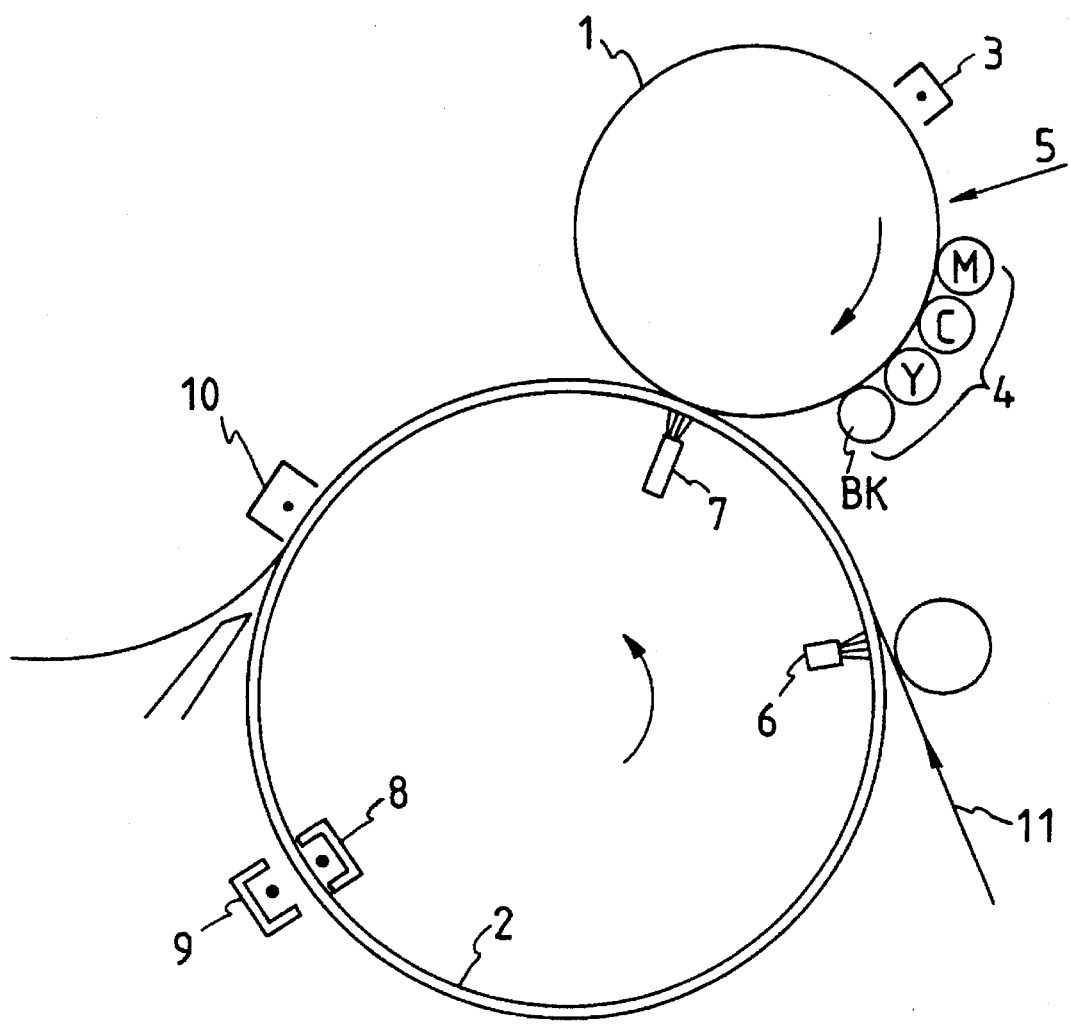
FIG. 2 is a schematic diagram of portions around a copy transfer drum of a color copying apparatus.

FIG. 1 is a circuit diagram of high voltage power sources for supplying currents to a transfer brush and an adsorption brush of a color copying apparatus according to an embodiment 1. FIG. 2 is a schematic diagram of portions around the transfer brush and adsorption brush to which output currents of the embodiment are supplied.

In FIG. 2, a toner image formed on the photosensitive drum 1 through a primary charging, an image exposure by a laser beam 5, and a developing process by a developing device 4 is copy transferred onto a copy transfer paper 11 adsorbed onto the copy transfer drum 2. Reference numeral 3 denotes a primary charging device.

The transfer drum 2 is formed by wrapping a thin Mylar film around a frame body on a cylinder and an image forming portion which is come into contact with the photosensitive drum 1 is constructed by a sole film body. An adsorption brush 6 functions for adsorbing the transfer paper 11 sent along a copy transfer guide onto the transfer drum 2 with an electrostatic force. The transfer brush 7 functions for copy transferring the toner on the photosensitive drum 1 onto the transfer paper 11 by the electrostatic force. Inside and outside post transfer charging devices 8 and 9 are used to reduce the absolute value of a voltage which is applied to the transfer brush, which will be explained hereinlater. A separation charging device 10 functions for completely eliminating the electrostatic adsorbing force between the transfer paper 11 and the transfer drum 2 by executing a corona charge of AC+DC. The high voltage power sources in the embodiment are used to supply currents to the transfer brush and adsorption brush mentioned above.

Figure 3:
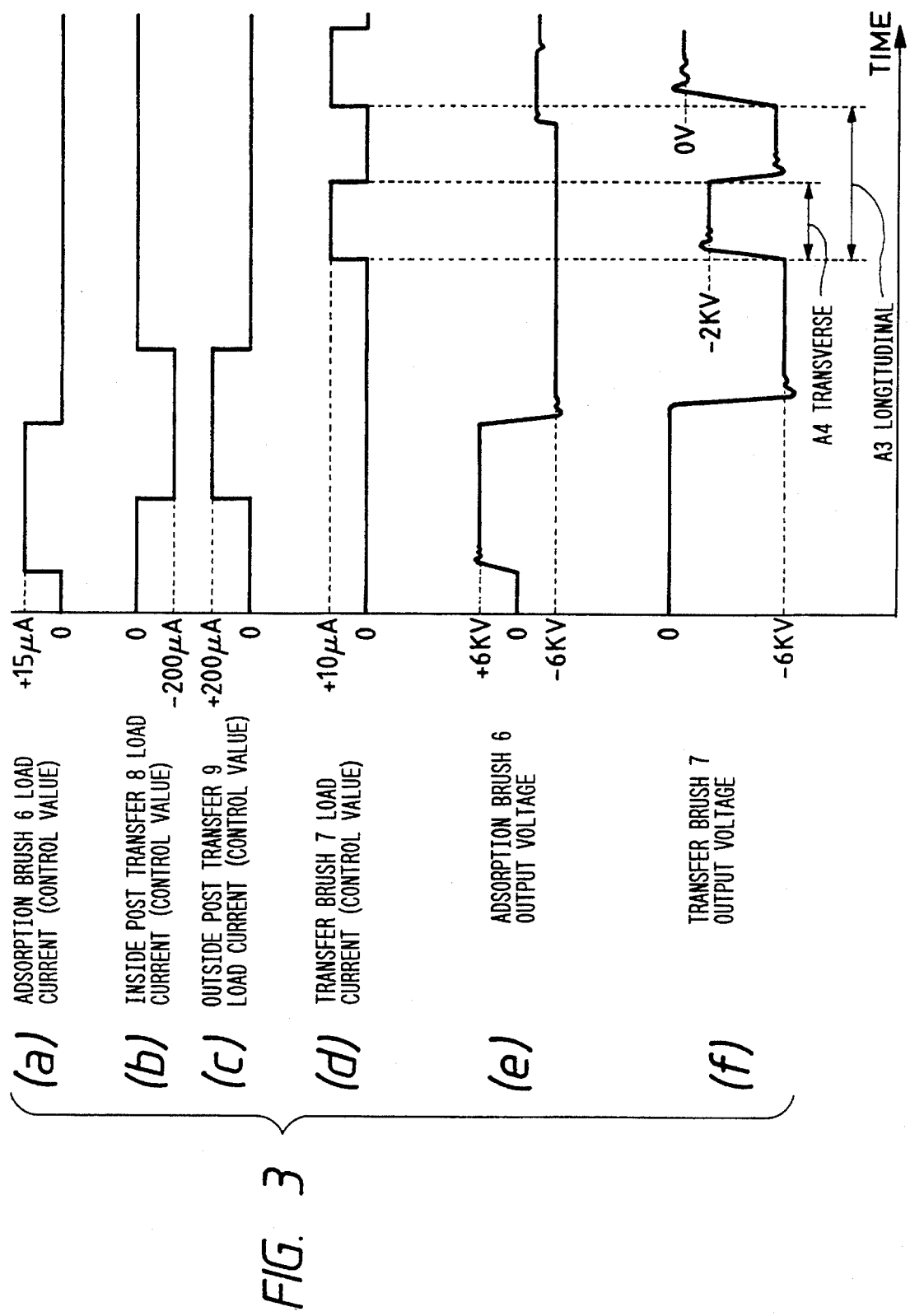
FIG. 3 is a diagram showing operation sequence timings of charging devices and a charging brush around the copy transfer drum of the color copying apparatus.

FIG. 3 shows operation sequence timings of charging devices and a charging brush around the transfer brush 2. The transfer drum 2 has a circumference of only a length such that one transfer paper of the A3 size can be wrapped around the drum surface in the longitudinal direction. FIG. 3 shows the case of copying an image onto one transfer paper of the A4 size.

When the transfer paper 11 is sent from the paper conveying system, a current of +15 μA is supplied to the adsorption brush 6 in the constant current control mode, thereby allowing the transfer paper 11 to be adsorbed to the transfer drum 2 [refer to (a) in FIG. 3]. A negative high voltage is applied to the inside post transfer charging device 8, thereby charging the inside of the transfer drum to −6 kV [refer to (b)]. At the same time, by applying a positive high voltage to the outside post transfer charging device 9, it is prevented that the transfer paper 11 is peeled off [refer to (c)]. When the transfer paper 11 is adsorbed to the transfer drum 2 and the inside of the transfer drum is further charged to −6 kV, a current of +10 μA is supplied to the transfer brush 7 in the constant current control mode [refer to (d)]. The toner image is copy transferred from the photosensitive drum 1 to the transfer paper 11. It is needless to say that the transfer process is repeated every four colors of magenta, cyan, yellow, and black.

The voltage which is applied to the transfer brush in this instance is maintained to about −6 kV for an interval of the paper as shown in (f) in FIG. 3. However, since the charges at the previous time are held at the transfer paper 11, such a voltage rises step by step of 2 kV every color [the voltage change after the third color is omitted in (f)]. After completion of the copy transfer of the fourth color, although not shown, a high voltage of AC+DC is applied to the separation charging device 10 and a corona charge is executed, thereby discharging the charges on the transfer paper 11 and transfer drum 2 and separating the transfer paper 11 from the transfer drum 2.

As will be obviously understood from the above description, constant current power sources of both of the positive and negative polarities must be used as power sources which are applied to the transfer brush 7 and adsorption brush 6. Further, specifically speaking, it is necessary to supply a constant current to a load 18 in correspondence to a voltage source which changes in a wide range of −6 kV to +6 kV and which is equivalently included in the load 18.

In FIG. 1, T1 and T2 denote high voltage transformers; 11′ and 12 primary side drive circuits; 13 to 15 error amplifiers; and 16 and 17 power amplifiers.

Although output voltages from the secondary side high voltage windings of the high voltage transformers T1 and T2 are respectively rectified by high voltage diodes D1 and D2, a rectified output of the high voltage diode D2 is connected through high voltage terminals P2 and P3 to the side opposite to the high voltage diode connecting side of the high voltage winding of the high voltage transformer T1. A load current is detected by a resistor R3 interposed between the side opposite to the high voltage diode connection of the high voltage winding of the high voltage transformer T2 and the ground.

Resistance values of the bleeder transistors R1 and R2 which are connected in parallel to a high voltage rectified output are selected to a value that is equal to or less than 1/10 of at least a load resistor RL.

The error amplifier 13 compares the load current detection output supplied to its non-inverting input terminal and a reference voltage which was supplied to an inverting input terminal through a terminal P4 and is controlled by a sequence controller (not shown).

The error amplifiers 13 to 15 are driven by positive and negative power sources $+V_{cc}$ and $-V_{EE}$. Since the power sources $+V_{cc}$ and $-V_{EE}$ have the same voltage difference as that of +15 V and −15 V, the intermediate value of the output ranges of the error amplifier is equal to the ground potential. The error amplifiers 14 and 15 execute an inverting amplification and a non-inverting amplification to an output of the error amplifier 13 by a predetermined ratio by setting the ground voltage to a center, respectively. Output signals of the error amplifiers 14 and 15 are supplied to the power amplifiers 16 and 17 through diodes D4 and D3, respectively.

The primary drive circuits 11′ and 12 comprise oscillation circuits, switching circuits, and the like and have a function to apply AC electric powers according to outputs of the power amplifiers 17 and 16 to the primary windings of the high voltage transformers T1 and T2, respectively.

In the case where the output of the error amplifier 13 is positive, the output of the error amplifier 15 is positive, the power amplifier 16 operates, and a positive voltage is generated at the high voltage terminal P1. In this instance, the output of the error amplifier 14 is negative, the diode D4 is shut off, the output of the power amplifier 17 is set to 0, no voltage is generated in the secondary winding of the high voltage transformer T2, and the high voltage diode D2 is shut off. Although the positive high voltage generated between the high voltage terminals P1 and P2 is applied to the load 18 and the bleeder resistor R2, since the resistance value of the resistor R2 is selected to a value which is enough smaller than the resistance value of the load resistor RL as mentioned above, most of the positive high voltage is supplied to the load 18 (adsorption brush or transfer brush). A constant current according to the voltage at the terminal P4 is generated by the feedback control.

When the output of the error amplifier 13 is negative, in a manner opposite to the case of the positive output, the high voltage transformer T1 is shut off, the high voltage transformer T2 operates, and a negative high voltage is supplied to the load 18.

As an error amplifier 13, an FET input type amplifier in which an input leakage current is very small is selected in order to raise a constant current control precision.

As described above, according to the embodiment, the constant current control can be performed by the voltage outputs of both of the positive and negative polarities. Since the outputs of both of the positive and negative power sources can be varied, it is sufficient to set the output ranges of both power sources to narrow values. The costs and size of the apparatus can be reduced and the reliability can be improved. The embodiment can be also similarly embodied in a color printer.

[Embodiment 2]

Figure 4:
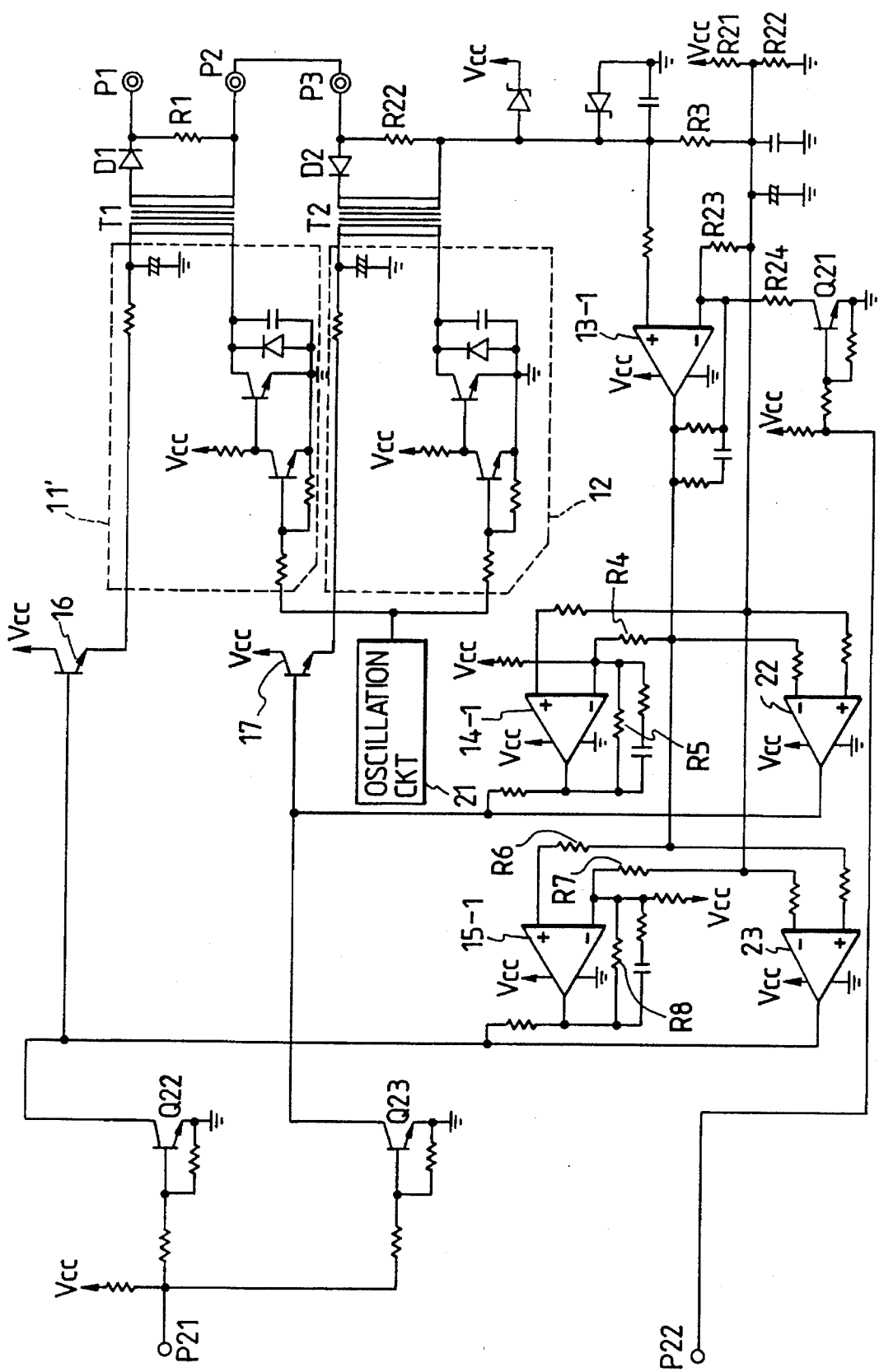
FIG. 4 is a circuit diagram of an embodiment 2.

FIG. 4 is a circuit diagram of an embodiment 2.

In the embodiment, a single power source of only $V_{cc}$ is used as a power source for driving the circuit. Therefore, the intermediate point voltage is equal to $V_{cc}/2$ instead of the ground potential and is obtained by dividing the voltage of the power source $V_{cc}$ by precise resistors R21 and R22. A high precise power source of 24 V+1% is supplied as $V_{cc}$. P21 denotes a remote input signal terminal of the output. P22 indicates a level switching input signal terminal of the output current.

In a standby mode of the copying apparatus, the terminal P21 is held in a high impedance state, transistors Q22 and Q23 are made conductive, the outputs of the power amplifiers (emitter-followers) 16 and 17 are set to the ground potential, the primary side current supply of the high voltage transformers T1 and T2 is stopped, and the secondary side outputs are set to 0.

In a copying mode, the terminal P21 is held at the ground potential, the transistors Q22 and Q23 are shut off, and the power amplifiers 16 and 17 current amplify the output voltages of the outputs of the error amplifier and comparator connected to the inputs.

The load current is detected by the resistor R3. One end of the resistor R3 is connected to a node of the resistors R21 and R22. Since the load current lies within a range of 1 to 20 μA and is enough smaller than a bias current of the resistors R21 and R22, the voltage of 12 V is almost accurately applied.

When the ground potential is applied to the terminal P22, the transistor Q21 is turned on and an inverting input of an error amplifier 13-1 is set to 12 V. Since the transistors Q22 and Q23 are turned off and a feedback control loop is completed, the potentials at the inverting input and the non-inverting input coincide and the current flowing in the resistor R3 for detection of a load current is controlled so as to be 0.

When the terminal P22 is opened, the transistor Q21 is made conductive and the inverting input of the error amplifier 13-1 is set to the voltage which is obtained by dividing the voltage 12 V by the precise resistors R23 and R24. In this instance, the voltage across the resistor R23 is equal to a voltage drop due to the load current of the resistor R3.

A threshold value is set to 12 V and either one of the drive circuits 11 and 12 of the positive and negative high voltage transformers T1 and T2 is selected by an output of the error amplifier 13-1.

When the output of the error amplifier 13-1 is equal to or higher than 12 V, it is amplified at a predetermined ratio by an error amplifier 15-1 by setting 12 V to a center. When the output of the error amplifier 13-1 is equal to 12 V, an output of the error amplifier 15-1 has been shifted by 12 V so as to be 0.

Outputs of comparators 22 and 23 are set in an open collector mode and have a function to set an input of a power amplifier on the inoperative side to 0. That is, when the output of the error amplifier 13-1 is equal to or higher than 12 V, the output of the comparator 22 is set to the ground potential, thereby setting an input of the power amplifier 17 to 0. On the other hand, an output of the comparator 23 is opened and the output of the error amplifier 15-1 is input to the power amplifier 16.

When the output of the error amplifier 13-1 is equal to or less than 12 V, an output of an error amplifier 14-1 is input to the power amplifier 17.

As mentioned above, in the embodiment 2, an effect similar to that of the embodiment 1 is also derived.

[Embodiment 3]

Figure 5:
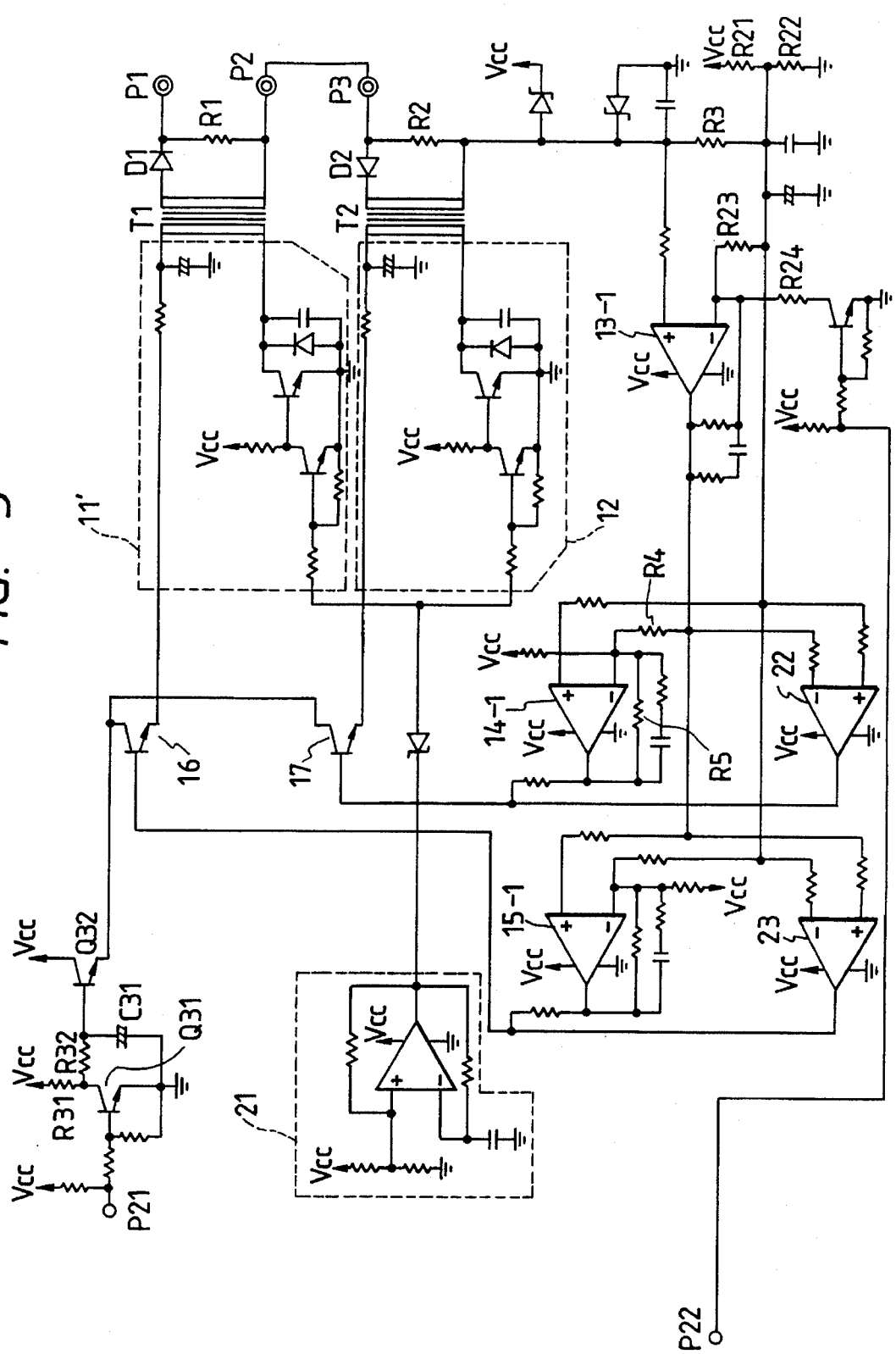
FIG. 5 is a circuit diagram of an embodiment 3.

FIG. 5 is a circuit diagram of an embodiment 3. According to the embodiment 3, a soft start function is added to the embodiment 2.

The input signal of the remote input terminal P21 is inverted by a transistor Q31. A collector output of the transistor Q31 is integrated by a resistor R32 and a capacitor C31. An integrated output is current amplified by an emitter-follower Q32 and supplied to the power amplifiers 16 and 17. When starting, the level switching input terminal P22 of the output current is set to the ground potential and the load current is controlled so as to be 0.

With the above construction, when the terminal P21 is set from the open state to the ground potential, the potential of the capacitor C31 gradually rises. The power source voltages of the power amplifiers 16 and 17 also rise in response to an increase in capacitor potential, so that a soft start is executed.

[Embodiment 4]

Figure 6:
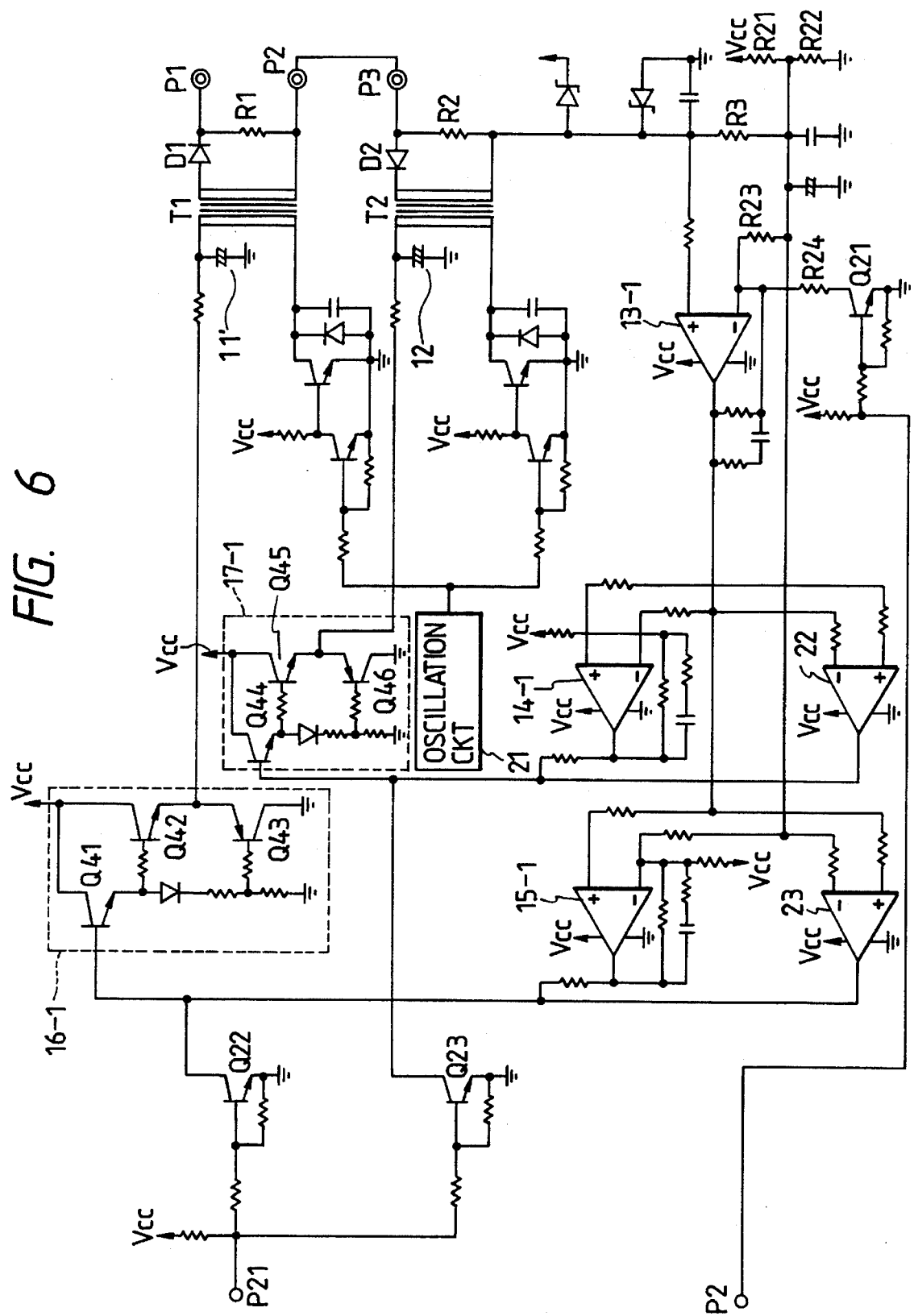
FIG. 6 is a circuit diagram of an embodiment 4.

FIG. 6 is a circuit diagram of an embodiment 4. As shown at reference numerals 16-1 and 17-1, according to the embodiment 4, a power amplifier is set to a bidirectional type, change speeds in the positive and negative directions of an output of the power amplifier are set to be almost equal, a stability of the feedback control is enhanced, and build-up and build-down speeds of the output are equalized.

[Embodiment 5]

Figure 7:
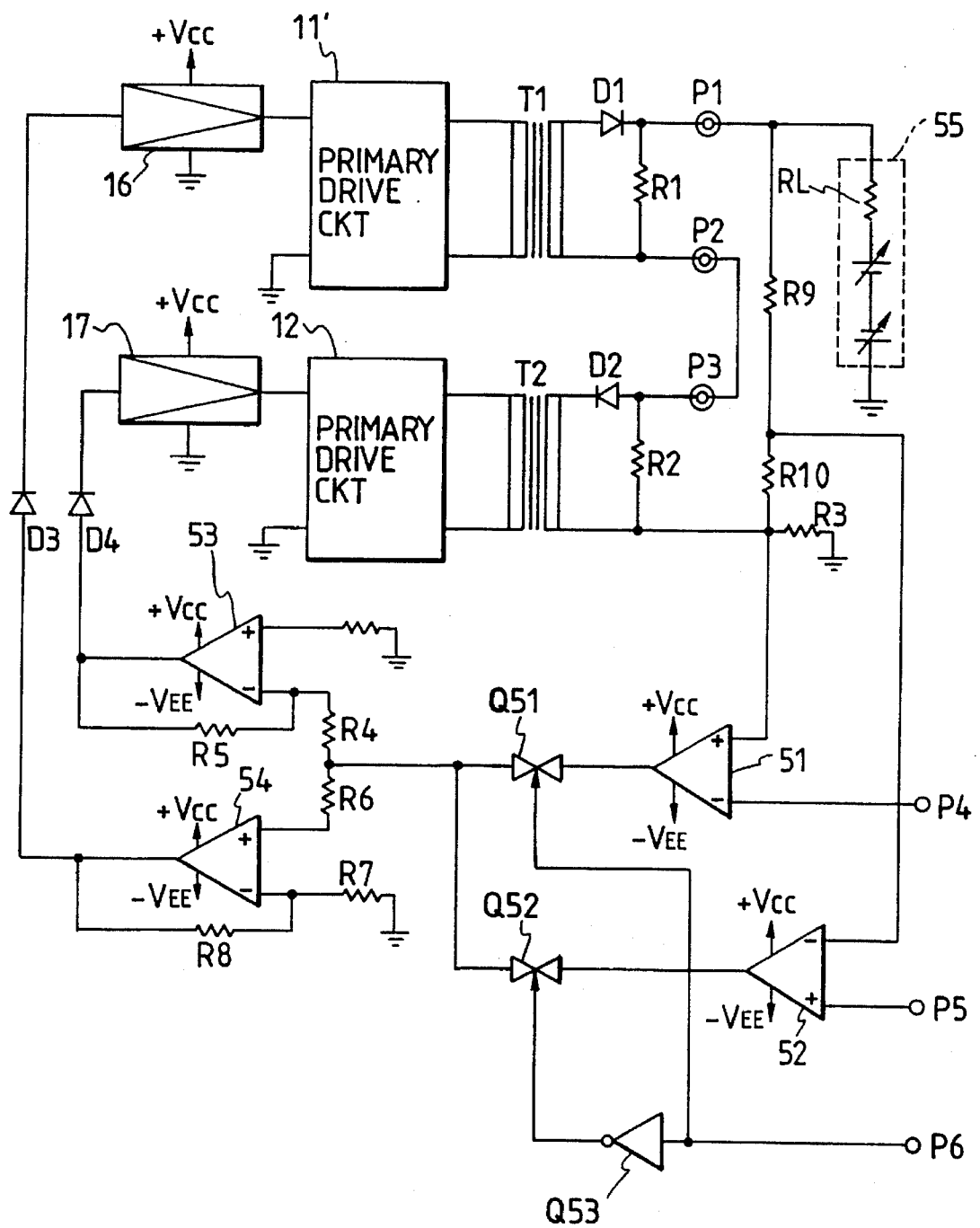
FIG. 7 is a circuit diagram of an embodiment 5.

FIG. 7 is a circuit diagram of a high voltage power source for supplying a current to a transfer brush of a copying apparatus according to the embodiment 5.

In the diagram, T1 and T2 denote the high voltage transformers; 11' and 12 the primary side drive circuits; 51 to 54 error amplifiers; and 16 and 17 the power amplifiers. Although output voltages of the secondary side high voltage windings of the high voltage transformers T1 and T2 are respectively rectified by the high voltage diodes D1 and D2, the rectified output of the high voltage diode D2 is connected to the side opposite to the high voltage diode connecting side of the high voltage winding of the high voltage transformer T1 through the high voltage terminals P2 and P3.

A load current is detected by the resistor R3 interposed between the side opposite to the high voltage diode connection of the high voltage winding of the high voltage transformer T2 and the ground. The value of the resistor R3 is selected to an enough small value. The output voltage is divided at a predetermined ratio by resistors R9 and R10 and is detected. The values of the bleeder resistors R1 and R2 which are connected in parallel to the high voltage rectified output are selected to values which are equal to or less than at least 1/10 of the load resistance RL.

The error amplifier 51 compares the load current detection output supplied to the non-inverting input terminal and a reference voltage which was supplied to an inverting input through the terminal P4 and which is controlled by a sequence controller (not shown). The error amplifier 52 compares the output voltage detection output supplied to an inverting input terminal and a reference voltage which was supplied to a non-inverting input through a terminal P5 and which is controlled by a sequence controller (not shown).

The error amplifiers 51 to 54 are driven by the positive and negative power sources $+V_{cc}$ and $-V_{EE}$. Since the voltages $+V_{cc}$ and $-V_{EE}$ have the same potential difference as that of +15 V and −15 V, respectively, the intermediate value of the output ranges of the error amplifiers is equal to the ground potential.

The error amplifiers 53 and 54 execute an inverting amplification and a non-inverting amplification at a predetermined ratio to the output of the error amplifier 51 or 52 selected by analog switches Q51 and Q52 by setting the ground potential to a center. Output signals of the error amplifiers 53 and 54 are input to the power amplifiers 17 and 16 through the diodes D4 and D3, respectively. Q53 denotes an inverter.

The primary drive circuits 11 and 12 comprise oscillating circuits, switching circuits, and the like and have a function for applying AC electric powers according to the outputs of the power amplifiers 16 and 17 to the primary windings of the high voltage transformers T1 and T2. When the output of the error amplifier 51 or 52 selected by the analog switches Q51 and Q52 is positive, the output of the error amplifier 54 is positive, the power amplifier 16 operates, and a positive high voltage is generated at the terminal P1. In this instance, the output of the error amplifier 53 is negative, the diode D4 is shut off, the output of the power amplifier 17 is set to 0, no voltage is generated in the secondary winding of the high voltage transformer T2, and the high voltage diode D2 is shut off.

Although the positive high voltage generated between the terminals P1 and P2 is applied to a load 55 and the bleeder resistor R2, as mentioned above, since the value of the resistor R2 is selected to a value which is enough smaller than the value of the lead resistor RL, most of the positive high voltage is supplied to the load 55 (transfer brush or transfer roller). When the output of the error amplifier 51 or 52 selected by the analog switches Q51 and Q52 is negative, in a manner opposite to the case of the positive output, the high voltage transformer T1 is shut off, the high voltage transformer T2 operates, and a negative high voltage is applied to the load 55. To raise the constant current control precision, an FET input type amplifier in which an input leakage current is very small is used as an error amplifier 51.

According to the embodiment as described above, the constant current control and the constant voltage control can be stably performed for a wide fluctuation of the load and the switching between the constant current mode and the constant voltage mode can be promptly executed.

The invention can be also similarly embodied in a printer.

[Embodiment 6]

Figure 8:
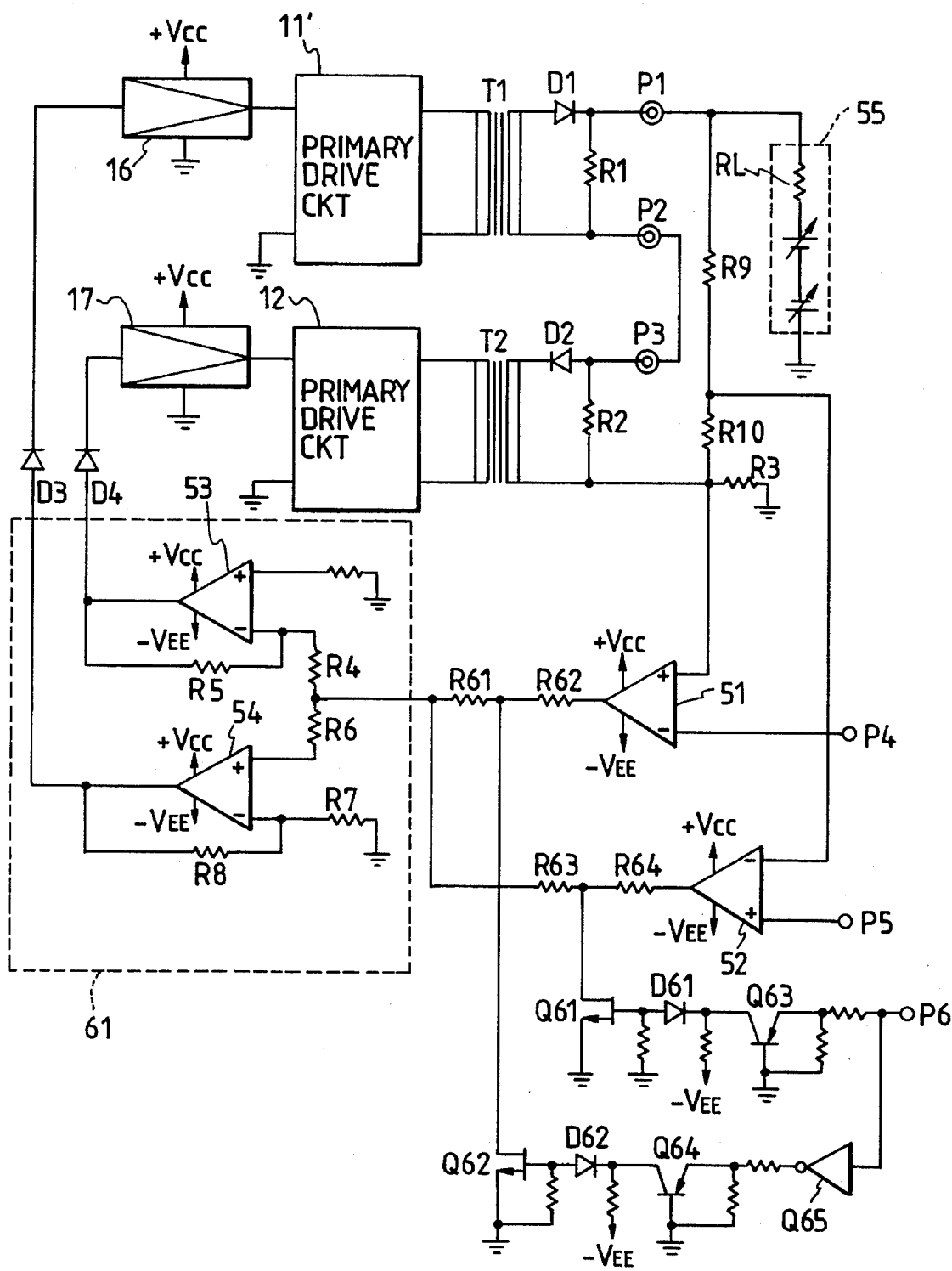
FIG. 8 is a circuit diagram of an embodiment 6.

FIG. 8 is a circuit diagram of an embodiment 6. The embodiment 6 uses a discrete circuit by an FET and a transistor in place of the analog switches Q51 and Q52 in the embodiment 5.

The outputs of the error amplifiers 51 and 52 are respectively connected to an input terminal of a level selecting circuit 61 through a series circuit comprising two resistors R61 and R62 and through a series circuit comprising two resistors R63 and R64.

By connecting the intermediate point of the above series resistor circuit to the ground via an FET Q61 or Q62, the output of the error amplifier 52 or 51 is shut off. Q65 denotes an inverter.

An output of an error amplifier on the side where the FET is shut off is attenuated at a predetermined ratio for another FET which is conductive. However, an attenuation amount is compensated by changing a gain of an amplifier of the level selecting circuit.

[Embodiment 7]

Figure 9:
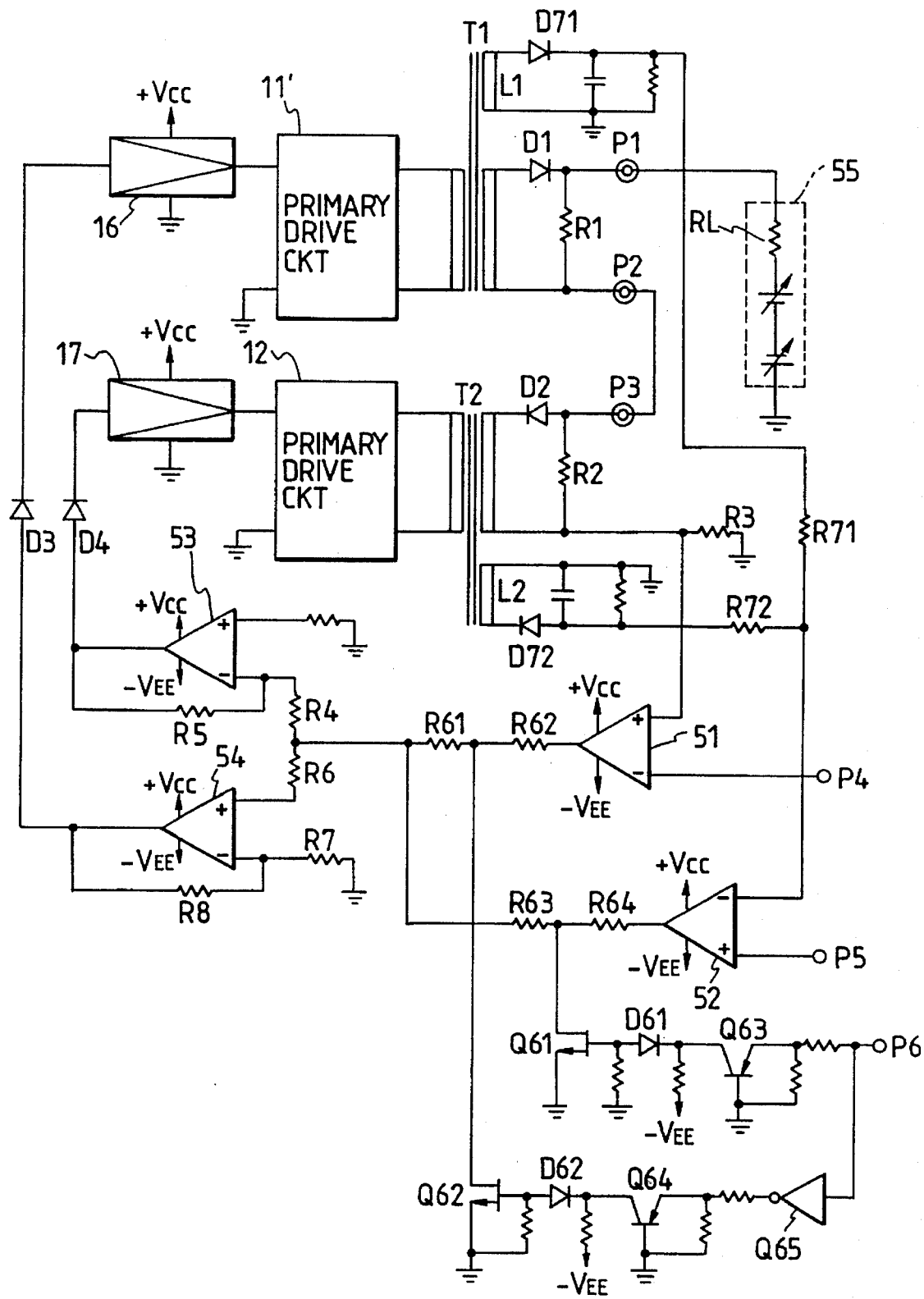
FIG. 9 is a circuit diagram of an embodiment 7.

FIG. 9 is a circuit diagram of an embodiment 7. The embodiment 7 is a modification of the embodiment 6 and is constructed in a manner such that in order to detect an output voltage, output detection windings L1 and L2 are provided for the high voltage transformers T1 and T2 and rectified outputs of the detection windings L1 and L2 are resistive coupled and supplied to an input terminal of the error amplifier 51.

[Embodiment 8]

Figure 10:
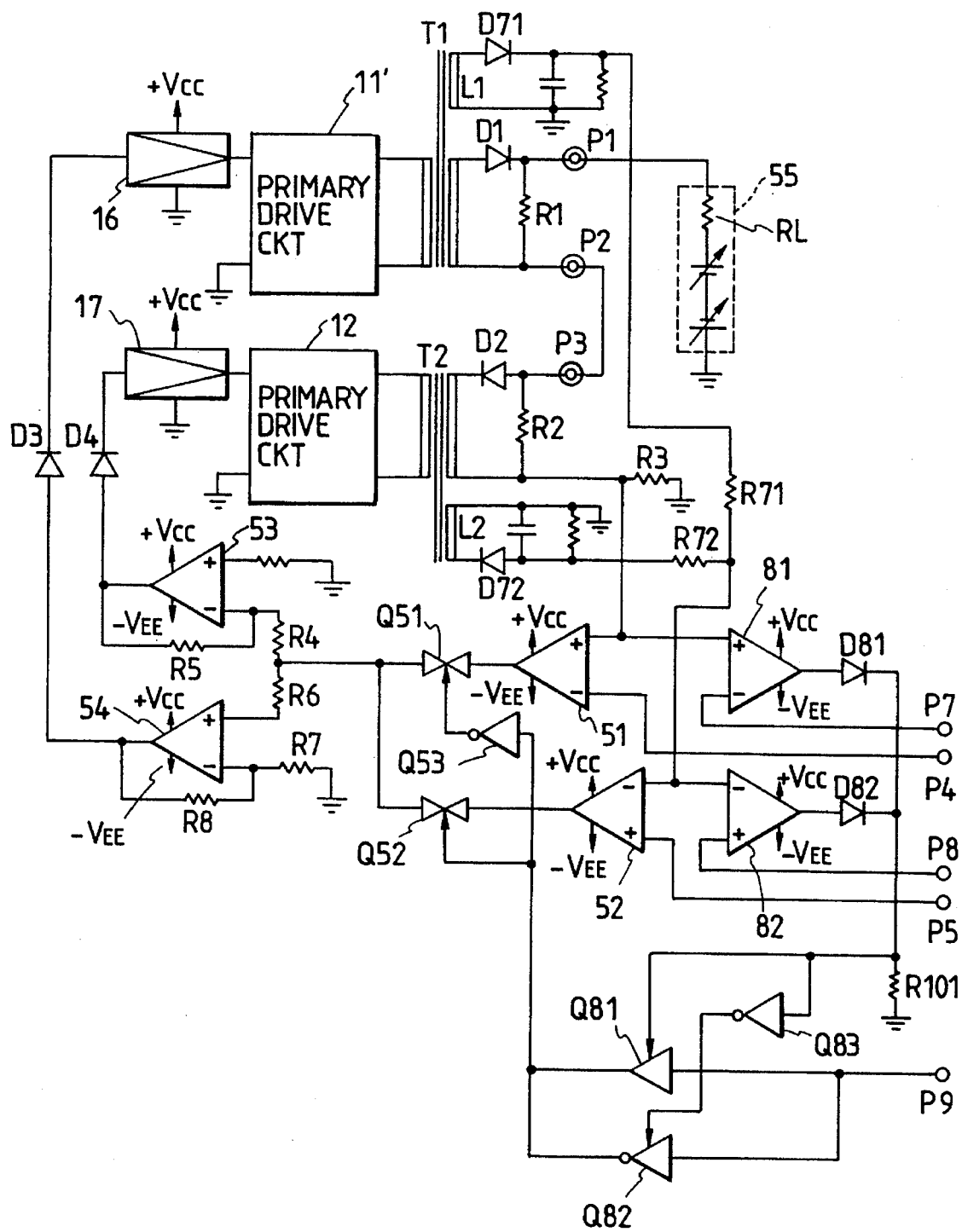
FIG. 10 is a circuit diagram of an embodiment 8.

FIG. 10 is a circuit diagram of an embodiment 8. The embodiment 8 is constructed by adding a current limiter function and a voltage limiter function to the modification embodiment 7.

Reference numeral 81 denotes a comparator to detect an overcurrent. The comparator 81 compares a current detection output and a reference voltage supplied to a terminal P7. Similarly, a comparator 82 for detection of an overvoltage compares a voltage detection output and a reference voltage supplied to a terminal P8. Q81 denotes a three-state buffer circuit and Q82 indicates a 3-state inverter.

When both outputs of the comparators 81 and 82 are at the low level, the output of the comparator 82 is set to a high impedance. The comparator 81 generates an output according to an input logic. Therefore, a control signal according to a control signal which was input to a terminal P9 is supplied to the analog switches Q51 and Q52. Q53 denotes the inverter.

When either one of the outputs of the comparators 81 and 82 is set to the high level, the output of the comparator 81 is set to a high impedance and a signal of the comparator 82 is a signal according to the logic. The control signal which was input to the terminal P9 is inverted and supplied to the analog switches Q51 and Q52. Therefore, when an overvoltage or overcurrent occurs, the control mode is switched from the constant current control mode to the constant voltage control mode or vice versa.

In this instance, when a control signal "L" of the constant current control mode is applied to the terminal P9, as for the reference signals to the terminals P4 and P5, the signal at the terminal P5 is switched so as to be a voltage limiter control value.

On the contrary, when a control signal "H" of the constant voltage control mode is applied to the terminal P9, the terminal P4 is switched so as to be set to a current limiter control value.

[Embodiment 9]

Figure 11:
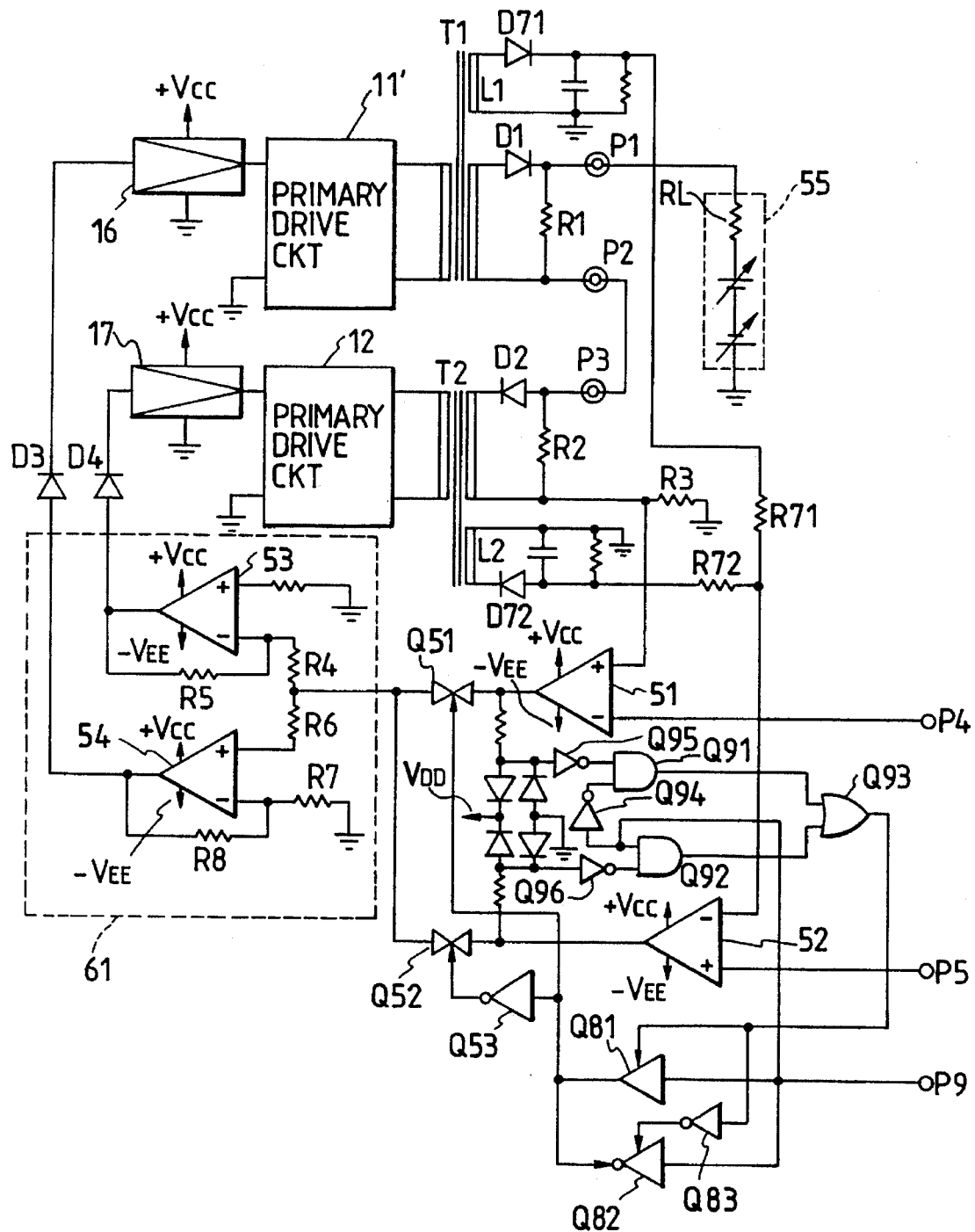
FIG. 11 is a circuit diagram of an embodiment 9.

FIG. 11 is a circuit diagram of an embodiment 9. According to the embodiment 9, a voltage limiter function and a current limiter function are added without using the comparators 81 and 82 in the embodiment 8.

Either one of the error amplifiers 51 and 52 is selected by logic circuits Q91 to Q96 and is connected to a limiter circuit.

In the constant current mode, the terminal P9 is set to the high level "H". In this instance, a reference voltage of the error amplifier 52 for detection of a voltage is set to the voltage limiter level. At this time, an output of the AND circuit Q91 is set to the low level and an output of the AND circuit Q92 is set to the logic level opposite to the level of the output of the error amplifier 52. When the voltage detection level exceeds the limiter level given to the terminal P5, the output of the error amplifier 52 is set to a negative value and an output of the 3-state inverter Q96 is set to the high level. Thus, both outputs of the AND circuits Q92 and Q93 are set to the high level, thereby setting an output of the 3-state buffer circuit Q81 to a high impedance. The inverter Q82 inverts a control switching signal (P9 input), thereby shutting off the analog switch Q51 and making the analog switch Q52 conductive. Therefore, the output of the error amplifier 52 is input to the level selecting circuit 61.

Practical examples in case of actually applying the invention to a color image forming apparatus will now be described with respect to embodiments 10 and 11.

[Embodiment 10]

Figure 12:
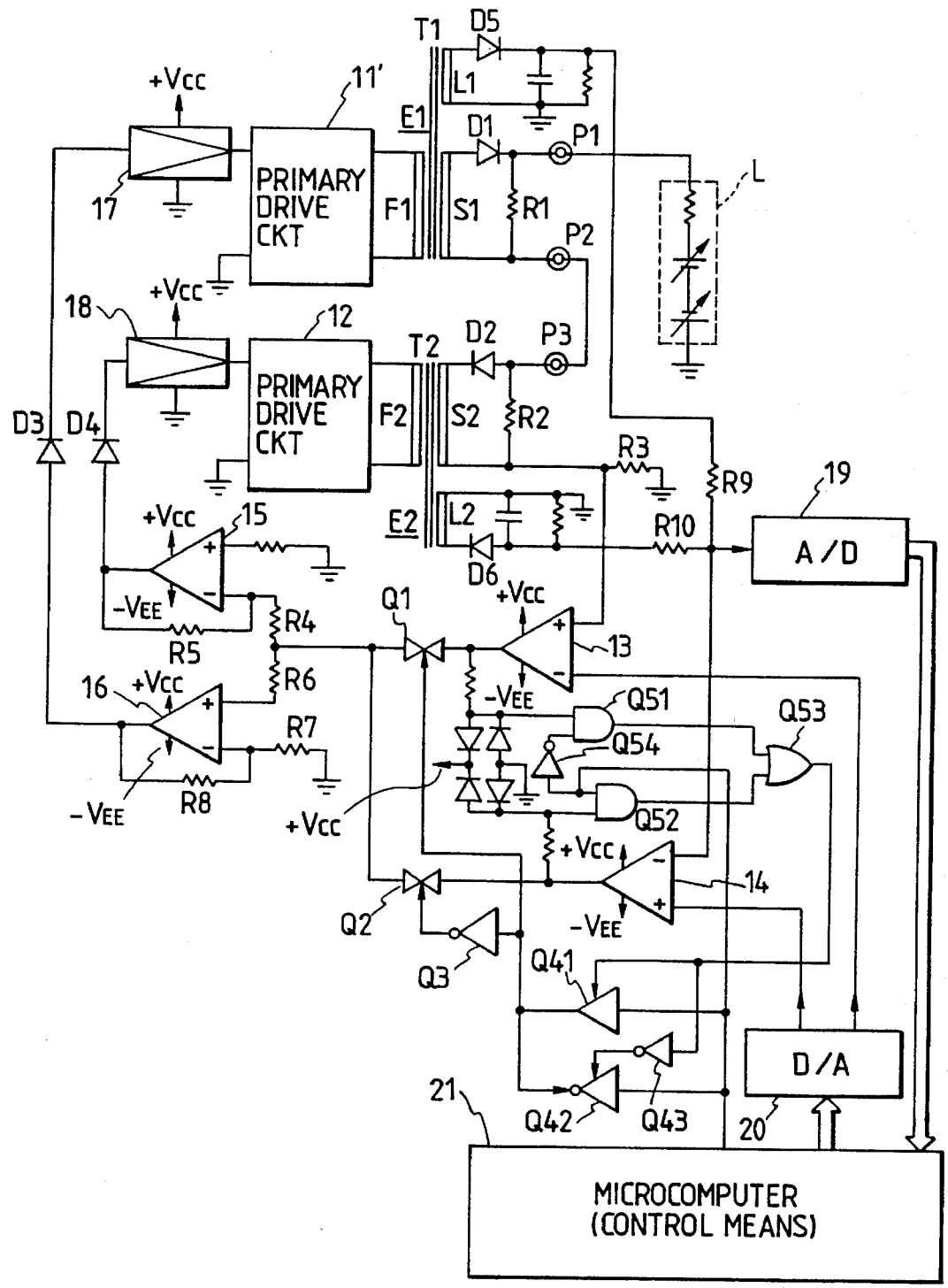
FIG. 12 is a circuit diagram showing a construction of an embodiment 10 of the invention.

FIG. 12 is a circuit diagram showing a construction of the embodiment 10 of the invention and shows a construction of a high voltage power source apparatus provided for an image forming apparatus of the electrophotographic system.

In FIG. 12, T1 and T2 denote the high voltage transformers of positive and negative high voltage power sources (DC/DC converters) E1 and E2 which can vary outputs and whose output sides are serially connected; 11' and 12 indicate the drive circuits for driving the primary sides; 13 to 16 the error amplifiers; and 17 and 18 the power amplifiers.

Outputs of secondary side high voltage windings S1 and S2 of the high voltage transformers T1 and T2 are respectively rectified by the diodes D1 and D2 for high voltage rectification. However, the rectified output side of the diode D2 is connected to the side opposite to the high voltage diode connecting side (one end side which is connected to a load L) of the high voltage winding of the transformer T1 through the high voltage terminals P2 and P3. A load current (output current) is detected by the resistor R3 constructing a current detecting circuit interposed between the side (another end side) opposite to the high voltage diode connecting side of the high voltage winding S2 of the high voltage transformer T2 and the ground. A resistance value of the resistor R3 is selected to an enough small value. The output voltage is detected by voltage dividing the rectified outputs of the output detection windings L1 and L2 of the high voltage transformers T1 and T2 by the coupling resistors R9 and R10 constructing a voltage detecting circuit on the basis of a predetermined ratio (equal magnification in this case). The detected output voltage is A/D converted into the digital signal by an A/D converter 19 and, after that, it is input to a microcomputer 21 and stored into an internal memory.

Values of the bleeder resistors R1 and R2 which are connected in parallel with the high voltage rectified output sides of the high voltage power sources E1 and E2 are selected to values of at least ⅓ or less of the load resistance RL.

The error amplifier 13 compares the detection output of the load current which was input from the forward rotation input side and an analog reference voltage which is obtained by D/A converting a control output of the microcomputer 21 by a D/A converter 20. The error amplifier 14 compares a detection output of the output voltage which was input from the inverting input side and the analog reference voltage which is obtained by D/A converting the control output of the microcomputer 21 by the D/A converter 20.

The error amplifiers 13 to 16 are driven by positive and negative power sources $+V_{cc}$ and $-V_{EE}$. Since the power sources $+V_{cc}$ and $-V_{EE}$ have the same voltage difference between +15 V and −15 V, the intermediate value of the output levels of the error amplifiers is set to the ground potential.

The error amplifiers 15 and 16 are an inverting amplifier and a non-inverting amplifier and execute an inverting amplification and a non-inverting amplification to the output of the error amplifier 13 or 14 selected by the analog switches (electronic switches) Q1 and Q2 on the basis of a predetermined ratio by setting the ground potential to a center, respectively. Outputs of the error amplifiers 15 and 16 are input to the power amplifiers 17 and 18 through the diodes D3 and D4, respectively.

The primary side drive circuits 11' and 12 on the primary sides of the high voltage transformers T1 and T2 comprise oscillating circuits, switching circuits, and the like and have a function for applying AC electric powers according to outputs of the power amplifiers 17 and 18 to primary windings F1 and F2.

When the output of the error amplifier 13 or 14 selected by the analog switches Q1 and Q2 is positive, the output of the error amplifier 16 is positive, the power amplifier 17 operates, and a positive high voltage is generated at the terminal P1. In this instance, the output of the error amplifier 15 is negative, the diode D4 is shut off, the output of the power amplifier 16 is set to 0, no voltage is generated in the secondary winding S2 of the high voltage transformer T2, and the high voltage diode D2 is shut off.

Although the positive high voltage generated between the terminals P1 and P2 is applied to the load L and the bleeder resistor R2, since the value of the resistor R2 is selected to a value which is enough smaller than the load resistance RL as mentioned above, most of the positive high voltage is supplied to the load L.

When the output of the error amplifier 13 or 14 selected by the analog switches Q1 and Q2 is negative, in a manner quite opposite to the case of positive output, the high voltage transformer T1 is shut off, the high voltage transformer T2 is operated, and a negative high voltage is supplied to the load L.

To raise a constant current control precision, an FET input type amplifier in which an input leakage current is very small is selected as an error amplifier 13.

In FIG. 12, D5 and D6 denote rectifying diodes; Q3 an inverter; Q41 a buffer; Q42 and Q43 inverters; Q51 and Q52 the AND gates; Q53 an OR gate; and Q54 an inverter.

Figure 13:
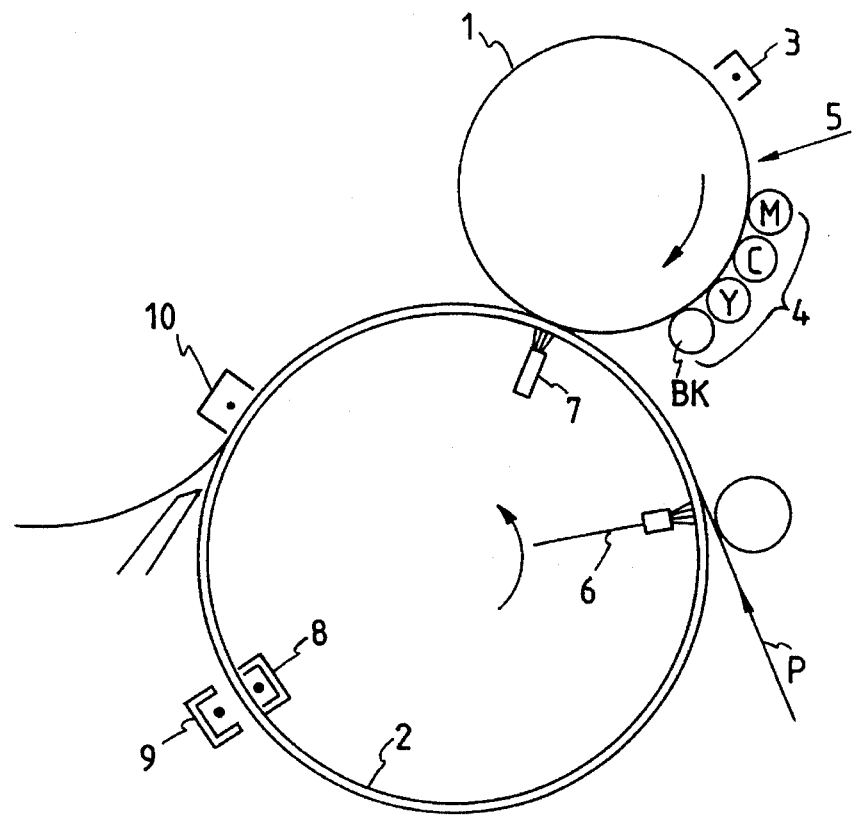
FIG. 13 is a constructional diagram of portions around a photosensitive drum and a copy transfer drum of an image forming apparatus.
Figure 14:
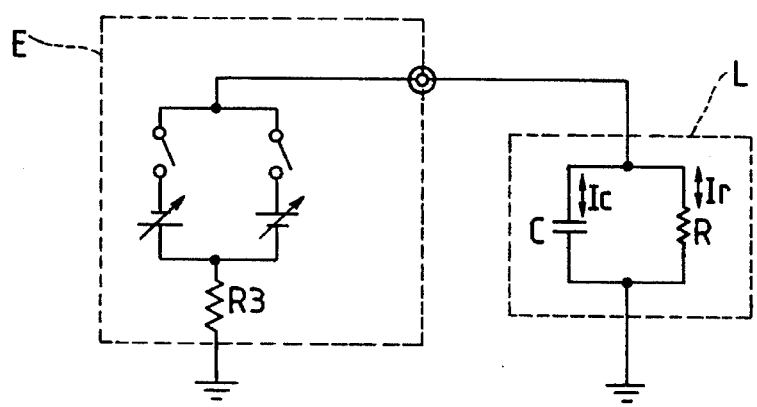
FIG. 14 is an equivalent circuit diagram of a load in FIG. 12.

Electric powers are supplied from the high voltage power source apparatus constructed as mentioned above to, for example, contact type transfer brush and adsorption brush as a load L. FIG. 13 shows a schematic construction of portions around a photosensitive drum and a transfer drum. FIG. 14 is a diagram showing an equivalent circuit of the load L.

In FIG. 13, a toner image formed on the photosensitive drum 1 through the charging by the primary charging device 3, image exposure by the laser beam 5, and developing process by the developing device 4 is copy transferred onto the copy transfer paper P adsorbed onto the surface of the transfer drum 2. The transfer drum 2 is formed by wrapping a thin Mylar film around a frame body on a circumference. An image forming portion which is come into contact with the photosensitive drum 1 is constructed by a film sole body.

The adsorption brush 6 has a function for adsorbing the transfer paper P which was sent along the transfer guide onto the transfer drum 2 with an electrostatic force. The transfer brush 7 has a function for copy transferring the toner image on the photosensitive drum 1 onto the transfer paper P by an electrostatic force. The inside and outside post transfer charging devices 8 and 9 are used to reduce the absolute value of the voltage which is applied to the transfer brush 7, which will be explained hereinlater. The separation charging device 10 has a function for completely eliminating the electrostatic adsorbing force between the transfer paper P and the transfer drum 2 by executing a corona charging of AC+DC.

Figure 15:
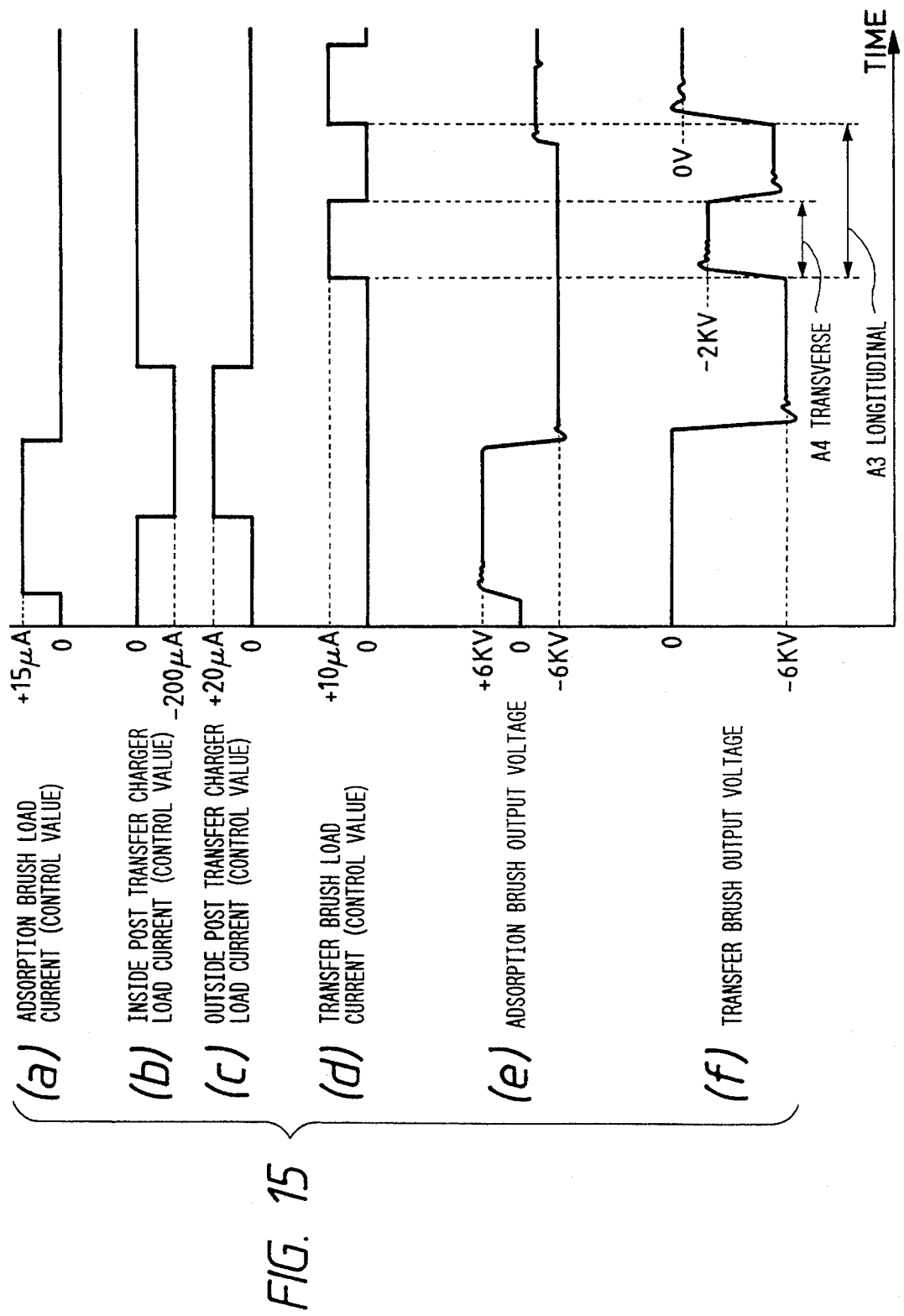
FIG. 15 is a waveform diagram showing operation sequences of charging devices and a charging brush around the copy transfer drum in FIG. 13.

FIG. 15 shows operation sequence timings of the charging devices and charging brush around the transfer drum 2. The transfer drum 2 has a circumferential length enough to wrap one transfer paper P of the A3 size to the surface of the drum 2 in the longitudinal direction. FIG. 15 shows the case of copying an image onto one transfer paper of the A4 size.

When the transfer paper P is sent from the paper conveying system, the high voltage power source apparatus supplies a current of +15 µA to the adsorption brush 6 in the constant current control mode, thereby allowing the transfer paper P to be adsorbed to the transfer drum 2. On the other hand, by applying a negative high voltage to the inside post transfer charging device 8, the inside of the transfer drum 2 is charged to −6 kV. At the same time, by applying a positive high voltage to the outside post transfer charging device 9, it is prevented that the transfer paper 9 is peeled off.

When the transfer paper P is adsorbed to the transfer drum 2 and, further, the inside of the transfer drum 2 is charged to −6 kV, a current of +10 µA is supplied to the transfer brush 7 in the constant current control mode, thereby transferring a toner image from the photosensitive drum 1 to the transfer paper P. It will be obviously understood that such transfer processes are repeated every four colors of magenta (M), cyan (C), yellow (Y), and black (Bk). As shown in (f) in FIG. 15, the voltage which is supplied to the transfer brush 7 is held at almost −6 kV for an interval of the paper. However, since the charges at the previous time are held at the transfer timing to the transfer paper P, such a voltage is raised step by step of about 2 kV every color. [(f) in FIG. 15, the voltage change after the third color is omitted.]

After the copy transfer of the fourth color was finished, although not shown, a high voltage of AC+DC is applied to the separation charging device 10 and the corona charging is executed, thereby discharging the charges on the transfer paper P and transfer drum 2 and separating the transfer paper P from the transfer drum 2.

As will be obviously understood from the above description, constant current power sources of both of positive and negative polarities must be used as power sources which are supplied to the transfer brush 7 and adsorption brush 6. Further specifically speaking, it is necessary to supply a constant current to the load L in correspondence to the voltage source which changes in a wide range of −6 kV to +6 kV which is equivalently included in the load L.

(a) in FIG. 15 shows a load current (control value: +15 µA) of the adsorption brush 6. (b) in FIG. 15 shows a load current (control value: −200 µA) of the inside post transfer charging device 8. (c) in FIG. 15 shows a load current (control value: +200 µA) of the outside post transfer charging device 9. (d) in FIG. 15 shows a load current (control value: +10 µA) of the transfer brush 7. (e) in FIG. 15 shows an output voltage (−6 kV to +6 kV) of the adsorption brush 6. (f) in FIG. 15 shows an output voltage (−6 kV to 0 V) of the transfer brush 7.

Figure 16:
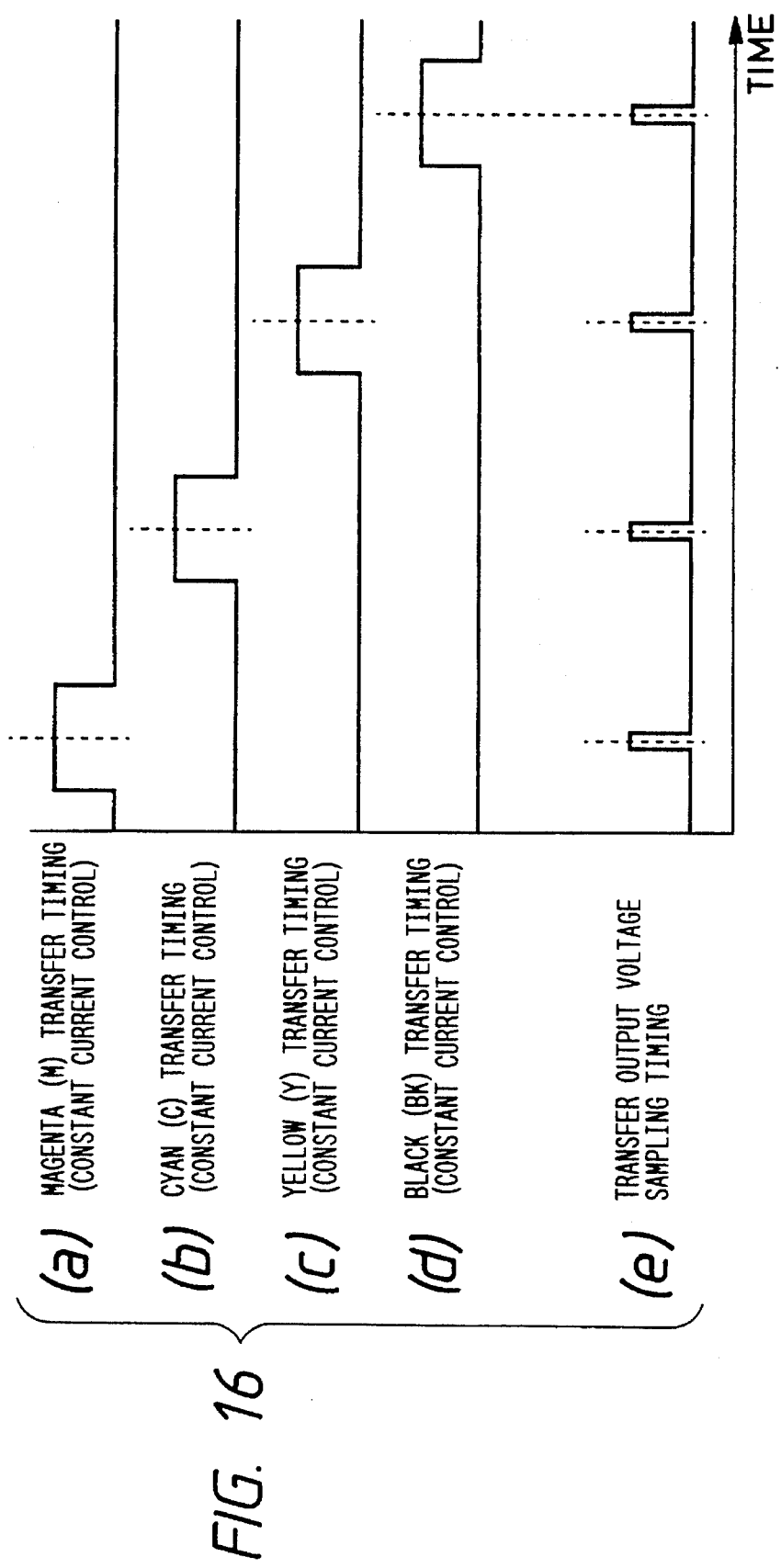
FIG. 16 is a timing chart showing a copy transfer timing of an adjustment mode in the embodiment 10.
Figure 17:
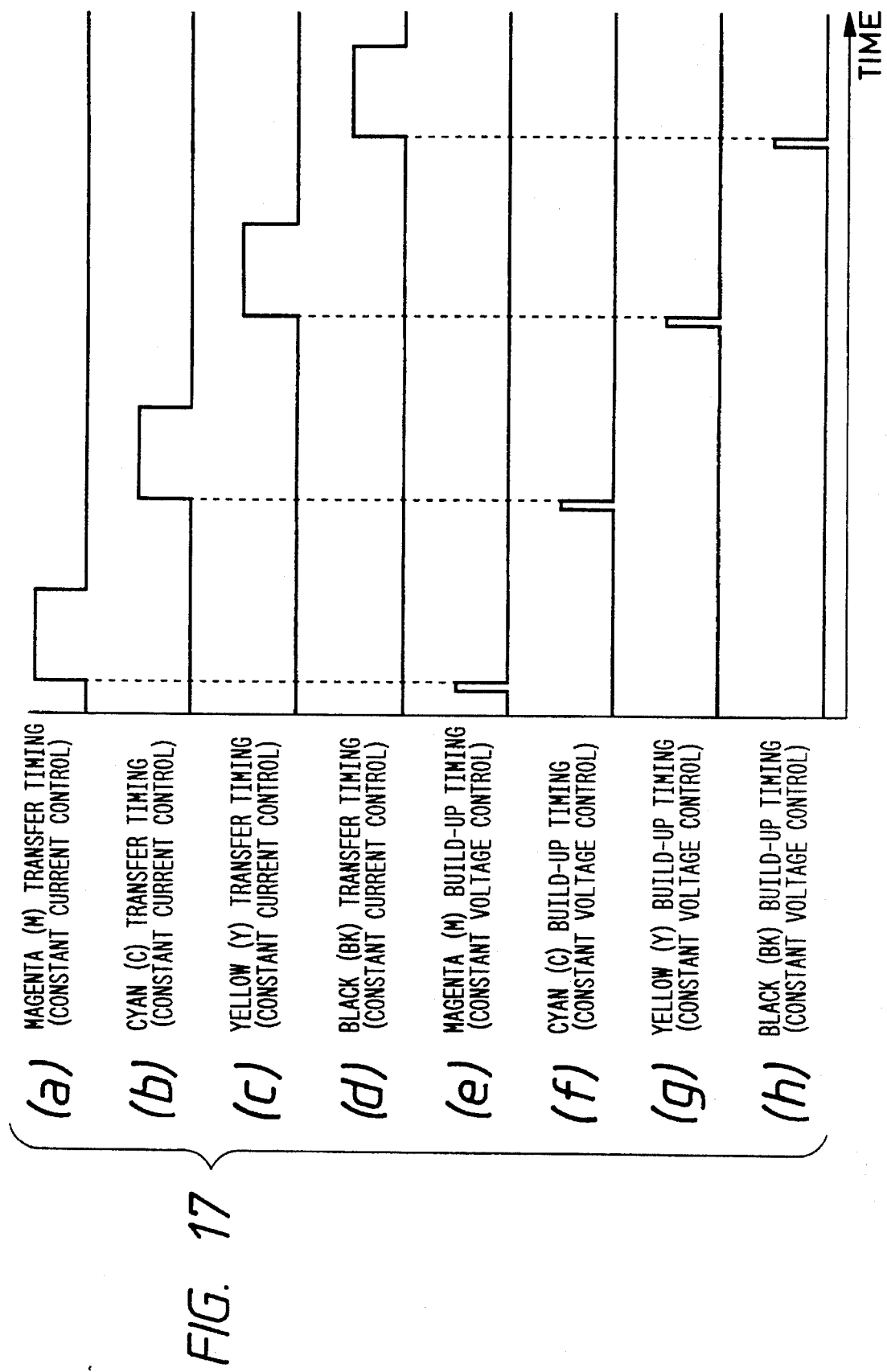
FIG. 17 is a timing chart showing an actual copy transfer timing in the embodiment 10.

FIGS. 16 and 17 are timing charts showing the operations of the embodiment. FIG. 16 shows a transfer timing of the adjustment mode. FIG. 17 shows a transfer timing when an image is actually formed.

(a) to (d) in FIG. 16 show transfer timings of magenta (M), cyan (C), yellow (Y), and black (Bk) in the constant current control. (e) in FIG. 16 shows a sampling timing of a transfer output voltage. (a) to (d) in FIG. 17 show transfer timings of magenta, cyan, yellow, and black in the constant current control. (e) to (h) in FIG. 17 show build-up timings of magenta, cyan, yellow, and black in the constant voltage control.

Figure 18:
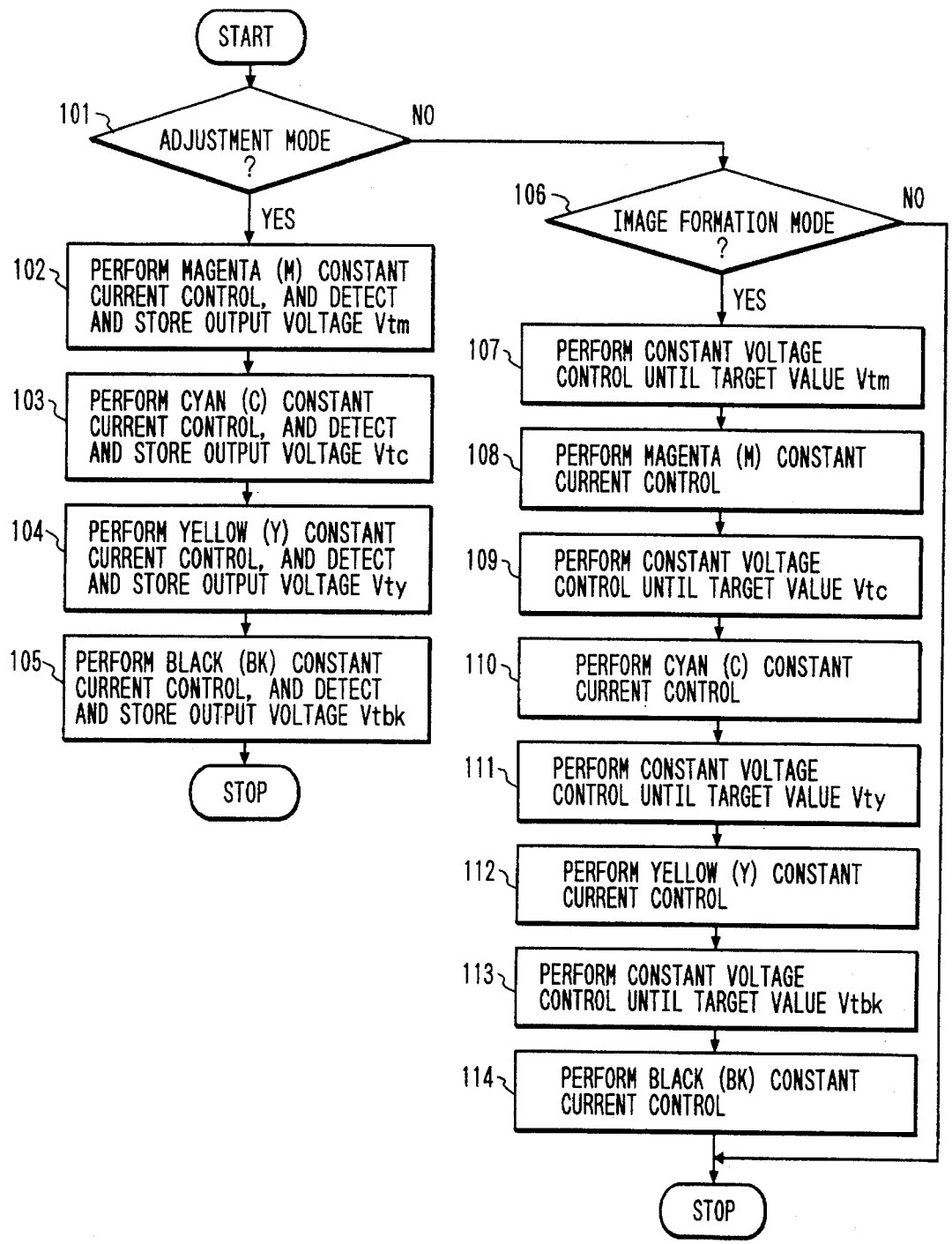
FIG. 18 is a flowchart showing the operation of the embodiment 10.

FIG. 18 is a flowchart showing the operation of the embodiment. First, the adjustment mode is selected at the time of shipping of the product from the factory or at the time of maintenance or inspection at the market. When the adjustment mode is set (step 101), as shown in FIG. 16, a constant current control is sequentially executed in accordance with the order of magenta, cyan, yellow, and black (steps 102 to 105). In this instance, a target value (reference value) of the constant current is equal to +10 µA in image intervals shown in (a) to (d) in FIG. 16 and is equal to 0 µA in the other non-image intervals. FIG. 18 shows the case of using a transfer paper of the A4 size.

Transfer voltages Vtm, Vtc, Vty, and Vtbk of magenta, cyan, yellow, and black are detected and measured at timings at which the constant current control is sufficiently stabilized, respectively, and are A/D converted into digital signals by the A/D converter 19. The digital signals are stored into the memory in the microcomputer 21.

In the image forming mode (step 106), as shown in FIG. 17, prior to the constant current control, the constant voltage control is executed and a load capacitor (floating capacity among the transfer brush, ground, and transfer roller) is rapidly charged until target values Vtm, Vtc, Vty, and Vtbk, respectively. After completion of the constant voltage control, the control mode is soon switched to the constant current control (steps 107 to 114).

In the high voltage power source apparatus for supplying electric powers to the adsorption brush 6 and transfer brush 7 mentioned above, both of the positive and negative high voltage power sources E1 and E2 whose output sides are serially connected can vary the outputs as shown in FIG. 12 and the positive and negative high voltage power sources E1 and E2 selectively operate in accordance with the detection outputs of the output voltages and output currents (load currents) of the high voltage power sources E1 and E2. Therefore, the costs and size of the apparatus are not increased, the reliability doesn't deteriorate, and the build-up time upon switching of the transfer current decreases, so that the image formation time is not increased.

[Embodiment 11]

Figure 19:
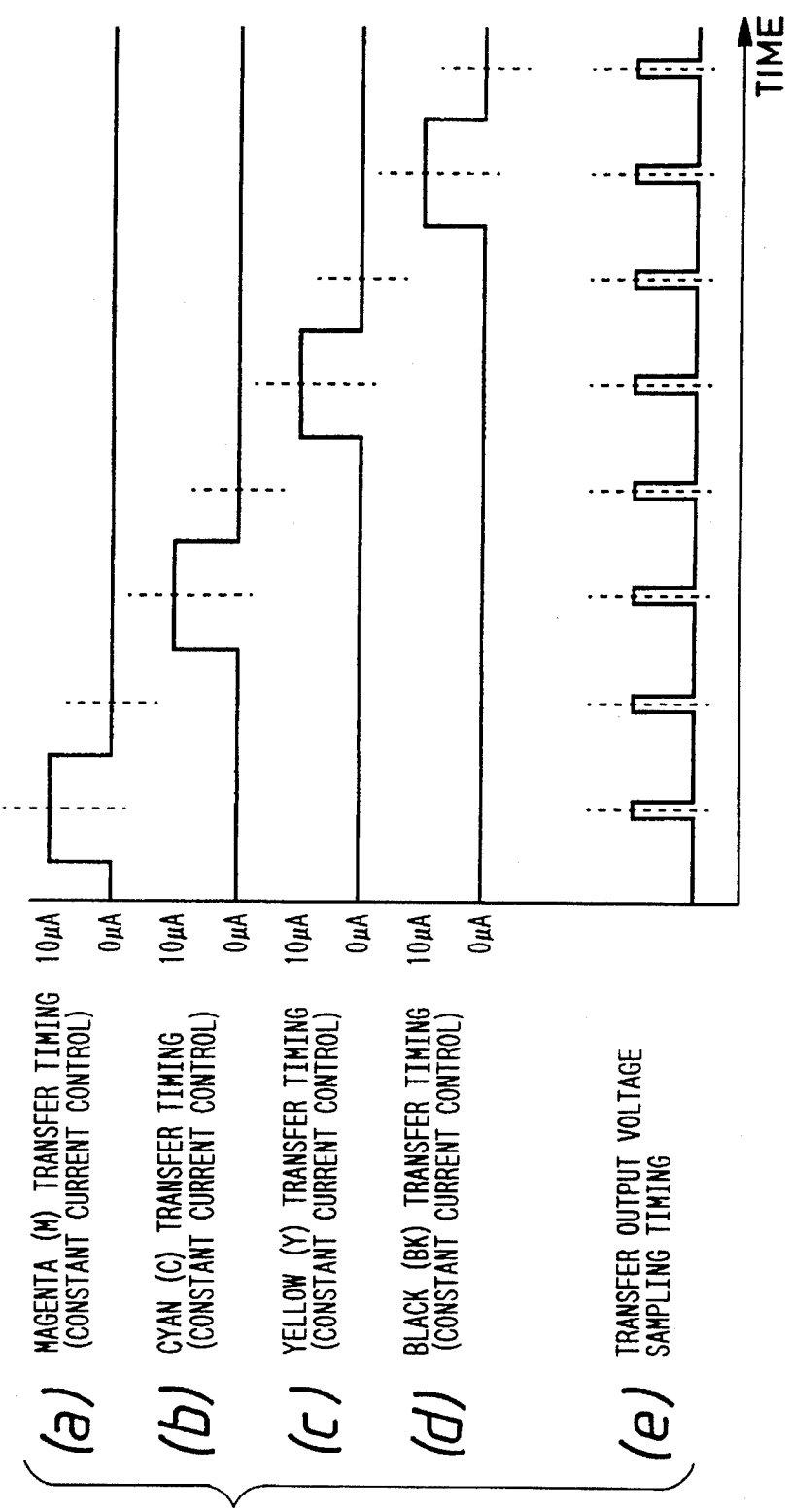
FIG. 19 is a timing chart showing a copy transfer timing of the adjustment mode in an embodiment 11.
Figure 20:
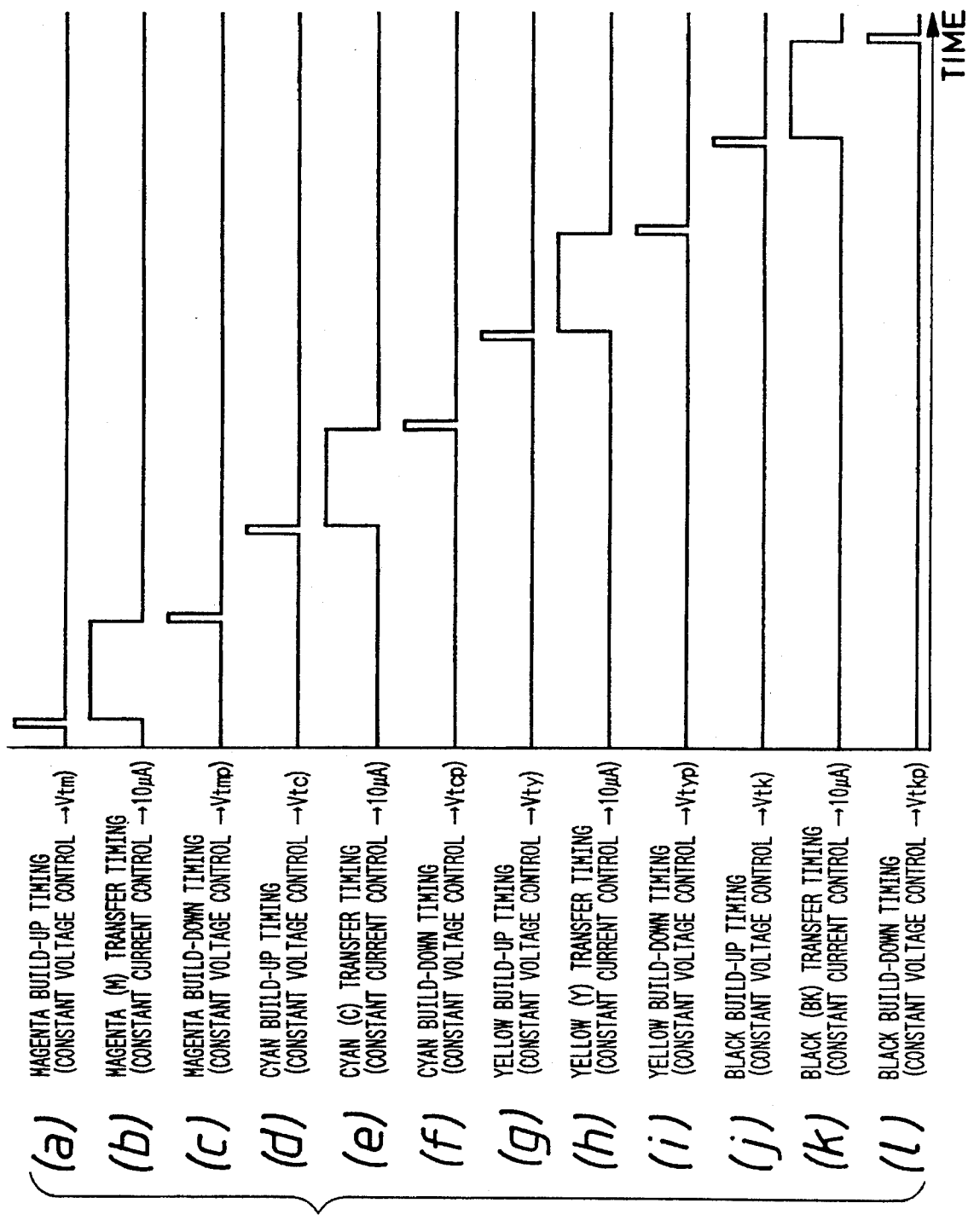
FIG. 20 is a timing chart showing an actual copy transfer timing of the embodiment 11.

FIGS. 19 and 20 are timing charts showing the operation of an embodiment 11. FIG. 19 shows a transfer timing of the adjustment mode. FIG. 20 shows an actual transfer timing.

As shown in FIG. 19 (a) to (d) in FIG. 19 show transfer timings of magenta (M), cyan (C), yellow (Y), and black (Bk) in the constant current control. Also (e) in FIG. 19 shows a sampling timing of a transfer output voltage. As shown in FIG. 20 (a) to (c) show a build-up timing, a transfer timing, and a build-down timing of magenta. Also shown in FIG. 20 are timings which (d) to (f) show a build-up timing, a transfer timing, and a build-down timing of cyan. Also (g) to (i) in FIG. 20 show a build-up timing, a transfer timing, and a build-down timing of yellow, and (j) to (l) in FIG. 20 show a build-up timing, a transfer timing, and a build-down timing of black.

Figure 21B:
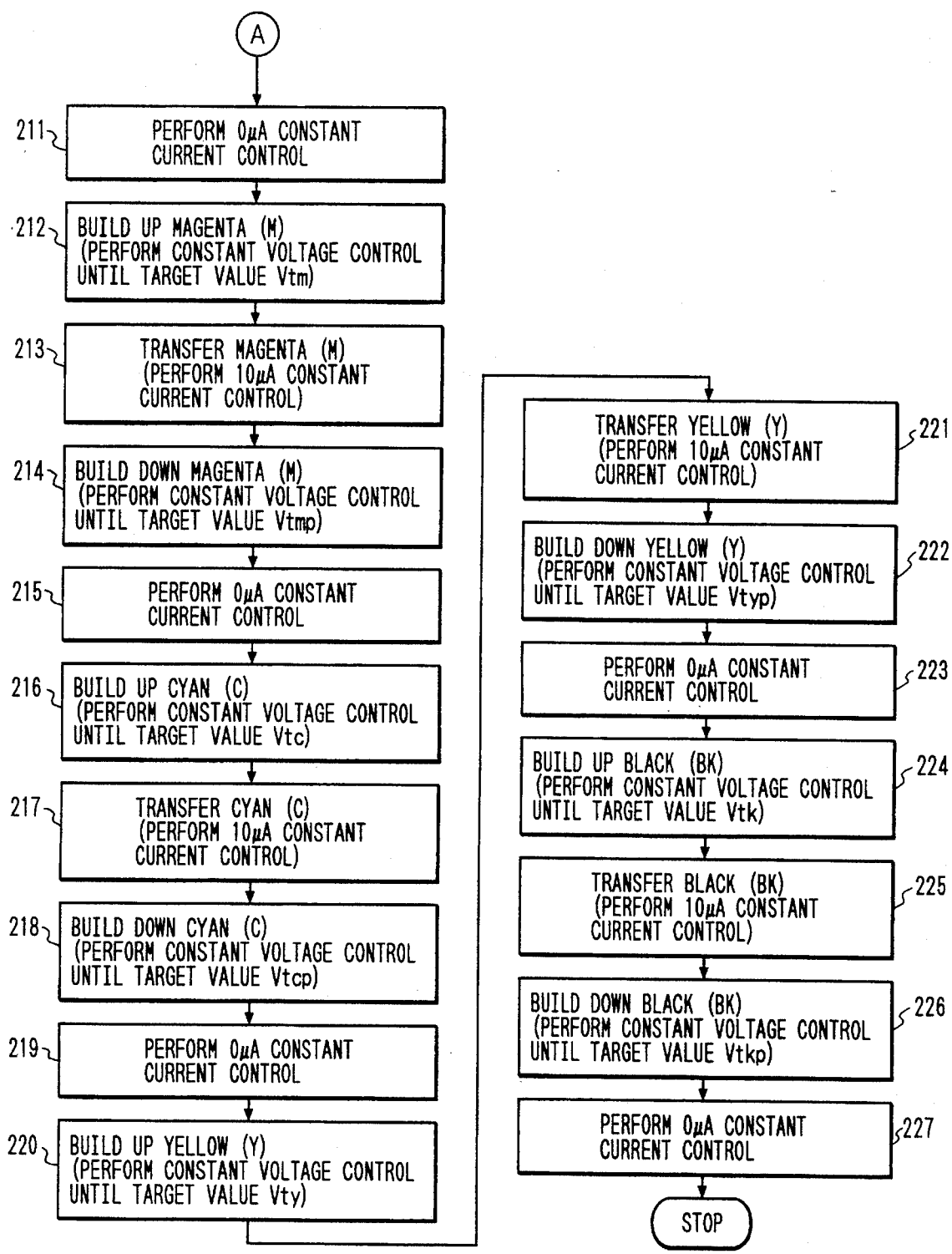
FIG. 21 is comprised of FIGS. 21A and 21B showing flowcharts of the operation of the embodiment 11.

FIGS. 21A and 21B are flowcharts showing the operation of the embodiment 11. According to the embodiment 11, a current is rapidly converged to 0 µA for a non-image interval, namely, for an interval of the paper and, after completion of the copy transfer, the constant voltage is applied to the transfer brush 7, thereby promptly charging the load capacitor.

First, upon shipping of the product from the factory or at the time of maintenance or inspection at a market, the adjustment mode is selected. When the adjustment mode is set (step 201), the constant current control is sequentially executed in accordance with the order of magenta, cyan, yellow, and black as shown in FIG. 19 (steps 202 to 209). In this instance, a target value of the constant current is equal to +10 µA in image intervals shown in (a) to (d) in FIG. 19 and is equal to 0 µA in the other non-image intervals. The diagrams show the case of using the transfer paper of the A4 size.

Together with the transfer voltages Vtm, Vtc, Vty, and Vtbk of magenta, cyan, yellow, and black, voltages Vtm, Vtc, Vty, and Vtbk for an interval of the paper are detected and measured at the timings when the constant current control is sufficiently stabilized, respectively. The measured voltages are A/D converted into the digital signals by the A/D converter 19 and stored into the memory in the microcomputer 21, respectively.

In the image forming mode (step 210), as shown in FIG. 20, the constant voltage control is executed prior to the transfer timing and the load capacitor (floating capacity among the transfer brush, ground, and transfer roller) is rapidly charged until the stored target values Vtm, Vtc, Vty, and Vtbk, respectively. After completion of the constant voltage control, the control mode is soon switched to the constant current control of the target value 10 µA (steps 211 to 226).

After completion of the copy transfer, the constant voltage control such that Vtm, Vtc, Vty, and Vtbk are set to target values is executed for only predetermined timings and, after that, the control mode is switched to the constant current control of a target value 0 µA (step 227). After those operations were executed, the high voltage power source is shut off (step 228).

[Embodiment 12]

Figure 22:
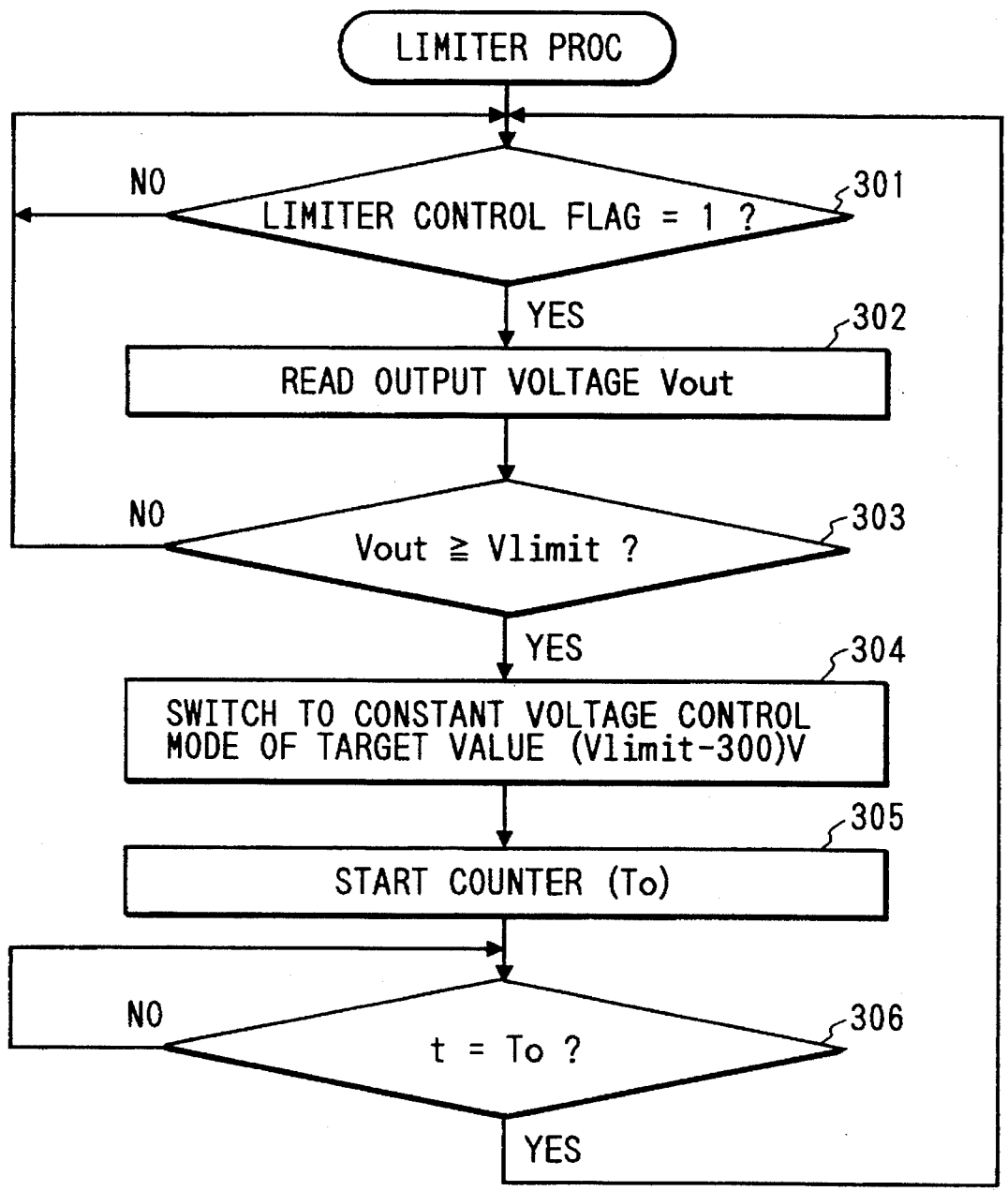
FIG. 22 is a flowchart showing the operation of an embodiment 12.

FIG. 22 is a flowchart showing the operation of an embodiment 12 of the invention. The embodiment 12 relates to an example in which an overvoltage limiter of an output is provided. In the constant current control, an overvoltage is applied to the load L due to a fluctuation of a load impedance, so that a spark leakage, a pin hole of the transfer drum 2, or the like occur. An accident which causes a defective image or a deterioration of the transfer drum 2 or photosensitive drum 1 occurs. The embodiment 12 intends to prevent such an accident.

A flowchart of FIG. 22 shows a limiter processing routine which is time-divisionally managed by an internal timer of the microcomputer 21. When a control flag is set to 1 at an allocation timing of the limiter process (step 301), an output Vout of the A/D converter 19 is read (step 302) and is compared with Vlimit (−6.5 kV) (step 303).

When the output voltage Vout exceeds Vlimit (−6.5 kV), the control mode is forcedly switched to the constant voltage control mode in which a voltage (−6.2 kV) that is lower than Vlimit (−6.5 kV) by 300 V is set to a target value (step 304). When such a state is continued for only a predetermined timing To by an internal counter of the microcomputer 21 (steps 305, 306), the processing routine is returned to an ordinary control routine.

The timing To must be selected to a value such that it is enough small so as not to exert an adverse influence on the ordinary control sequence and, when the processing routine is returned to the ordinary control routine after completion of the limiter operation, it doesn't immediately exceed the limiter level.

Although each of the embodiments of the invention has been described above, in the circuit of FIG. 12, the error amplifier 14 serves as a first error amplifier for comparing the output of the voltage detecting circuit (resistors R9 and R10) and a predetermined reference voltage and the error amplifier 13 serves as a second error amplifier for comparing the output of the current detecting circuit (R3) and a predetermined reference current. A differential voltage between the output of the error amplifier 13 or 14 selected by the analog switches Q1 and Q2 and the intermediate value of the output levels of the error amplifiers 13 and 14 is amplified by the error amplifiers 15 and 16 as an inverting amplifier and a non-inverting amplifier. The outputs of the high voltage power sources E1 and E2 are controlled by the drive circuits 11' and 12 in accordance with the amplified outputs.

In this instance, it is also possible to construct in a manner such that a comparator for comparing the output of the error amplifier 13 or 14 selected and the intermediate value is provided and the positive and negative high voltage power sources E1 and E2 are selectively operated by an output of the comparator, thereby executing the bipolarity constant voltage control and constant current control.

As mentioned above, according to the embodiments 1 to 12 of the invention, the costs and size are not increased, the reliability is not deteriorated, the build-up time upon switching of the transfer current decreases, and it is possible to prevent that the image formation time increases. Namely, the following effects are obtained.

(1) In case of performing the constant current control to the charging load of the high voltage in which a micro current is set to a target value, a drawback such that the build-up time and build-down time of the charging current are fairly increased due to an influence by the charge/discharge currents of the load capacitor and the image forming speed is reduced can be perfectly solved without increasing an overshoot upon switching of the current.

(2) A limiter which can promptly limit an overvoltage at the time of an abnormality of the load at a high precision can be easily realized, namely, without adding any hardware circuit. Therefore, a deterioration of the transfer drum, exposing drum, or the like can be completely prevented. The deterioration of the image can be minimized.

(3) As compared with the conventional bipolarity high voltage generating system in which a fixed output DC/DC converter and a variable output DC/DC converter are serially connected, since both of the positive and negative DC/DC converters have been made variable. Therefore, a dynamic range of each DC/DC converter can be reduced.

(4) A constant current can be automatically stably supplied for every fluctuation of a resistive component and a voltage source component included in the load side.

(5) Since the positive and negative DC/DC converters are switched by setting the intermediate value of the outputs of the error amplifiers to a threshold value, the operations of the positive and negative DC/DC converters can be smoothly switched and no abnormality occurs in the output.

(6) The outputs of the error amplifiers are amplified by setting the intermediate level of the outputs to the center and applied to the DC/DC converters, so that the switching operation between the positive and negative DC/DC converters mentioned in the above item (3) can be further smoothly executed.

(7) By comparing the outputs of the error amplifiers and the intermediate level of the outputs by the comparator and by stopping the DC/DC converter on the non-selection side, the switching operation between the positive and negative DC—DC converters mentioned in the above items (3) and (4) can be further smoothly performed.

[Embodiment 13]

Figure 23:
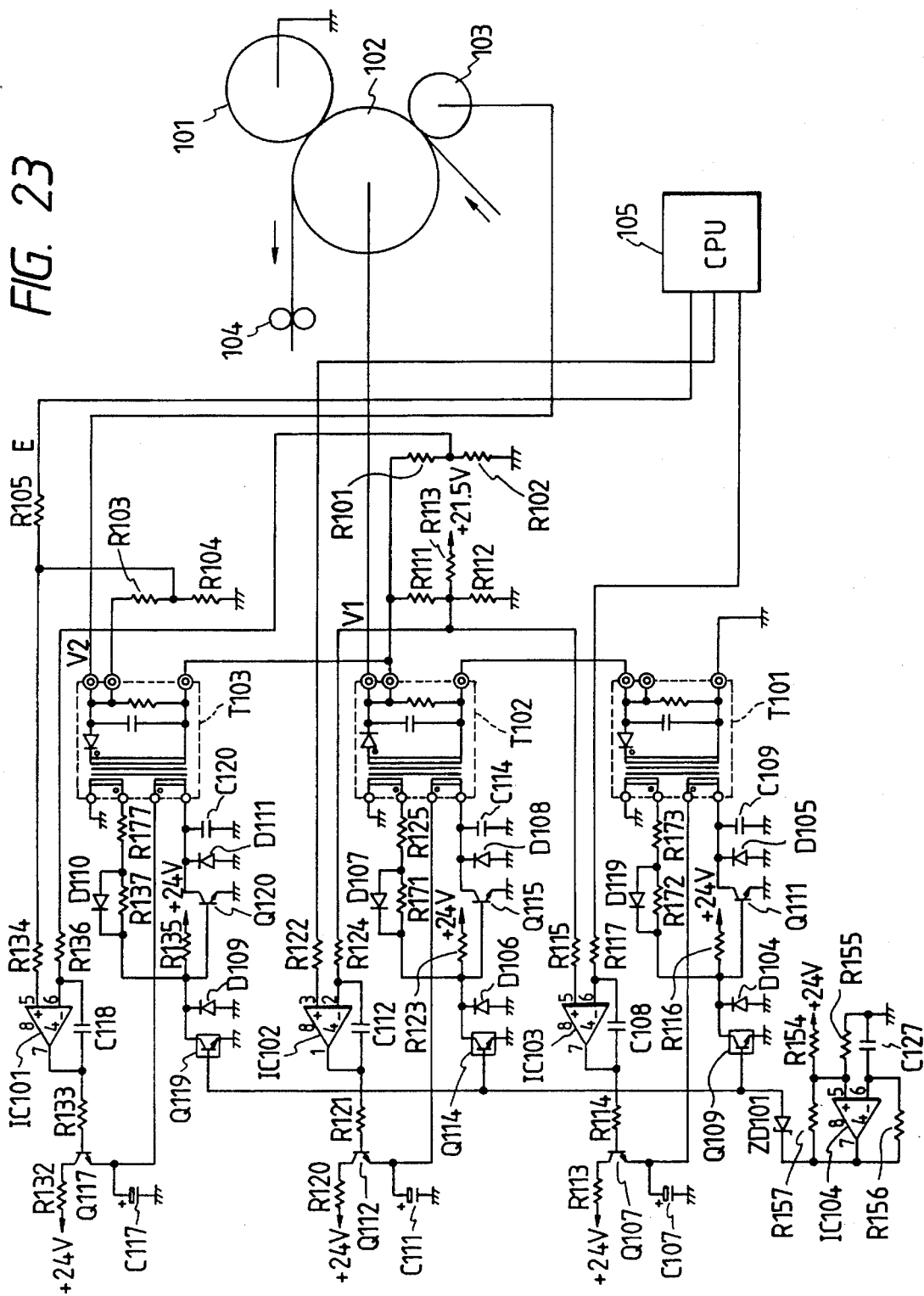
FIG. 23 is a high voltage power source circuit diagram of a copying apparatus according to an embodiment 13.

FIG. 23 is a circuit diagram of a high voltage power source for charging of a copying apparatus according to an embodiment 13. In the diagram, an operational amplifier IC104, resistors R154 to R157, and a capacitor C127 construct an oscillator of a rectangular wave. According to the oscillator, transistors Q111, Q115, and Q120 are switched through transistors Q109, Q114, and Q119, thereby driving flyback transformers T101, T102, and T103. The flyback transformer T101 constructs a voltage oscillating type switching flyback circuit together with a capacitor C109 and a diode D105. The flyback transformer T102 constructs a voltage oscillating type switching flyback circuit together with a capacitor C114 and a diode D108. The flyback transformer T103 constructs a voltage oscillating type switching flyback circuit together with a capacitor C120 and a diode D111.

Each of the flyback transformers T101 to T103 has therein a rectifying circuit and generates a direct current. The flyback transformer T101 is connected to a power source through a resistor R113 and a transistor Q107. In this instance, by controlling a voltage which is supplied to the flyback transformer T101 by the transistor Q107, an output voltage of the flyback transformer T101 can be controlled. An output voltage of the transistor Q107 is decided to an output of an operational amplifier IC103. Similarly, an output voltage of the flyback transformer T102 is controlled by an operational amplifier IC102. An output voltage of the flyback transformer T103 is controlled by an operational amplifier IC101. The output of the flyback transformer T101 produces a high voltage of a negative polarity and is input to one end of the output of the flyback transformer 102. Another end of the flyback transformer T102 produces a high voltage of the positive polarity and supplies the output to the transfer drum 102. Thus, a high voltage in a range from the positive polarity to the negative polarity is applied to the transfer drum 102. Reference numeral 101 denotes a photosensitive drum and 104 indicates a fixing device. Each arrow written near the drum indicates a paper conveying direction.

The output voltage which is supplied to the transfer drum 102 is divided by resistors R111, R112, and R113. A voltage 21.5 V which is connected to the resistor R113 is a reference power source and a level is shifted so that the detection voltage is not set to the negative polarity. The divided voltage is input to the operational amplifier IC102 through a resistor R124 as a detection signal. The operational amplifier IC102 executes the constant voltage control of the DC high voltage output of the flyback transformer T102 so as to become the voltage that is decided by a control signal which is input from a CPU 105 through a resistor R122. Similarly, the detection signal is input to the operational amplifier IC103 through a resistor R115. The operational amplifier IC103 performs the constant voltage control of the DC high voltage output of the flyback transformer T101 so as to become the voltage that is decided by a control signal which is input from the CPU 105 through a resistor R117. In this instance, the CPU 105 executes a control so as to generate either one of the positive and negative polarities.

The output of the flyback transformer T102 is connected to one end of an output winding of the flyback transformer T103. Another end of the output of the flyback transformer T103 produces a high voltage of the negative polarity for the transfer output and supplies the output to an adsorption drum 103. The output voltage which is supplied to the adsorption drum 103 is divided by resistors R103 and R104 and is also input as a detection signal to the operational amplifier IC101 through a resistor R134. The control signal which is input from the CPU 105 is supplied to the resistor R134 through a resistor R105. The output voltage which is supplied to the transfer drum 102 is divided by resistors R101 and R102 and is supplied as a detection signal to another input terminal of the operational amplifier IC101 through a resistor R136.

In this instance, now assuming that the transfer voltage is set to V1, the adsorption voltage is set to V2, and the adsorption control voltage from the CPU 105 is set to E, the following equation (1) is obtained.

$$(R103 \times R104 + R104 \times R105 + R105 \times R103) \times R102 \times V1 - (R101 + R102) \times R104 \times R105 \times V2 = (R101 + R102) \times R103 \times R104 \times E \quad \ldots (1)$$

Now, assuming that R101=R103 and R104=R105=2×R102, the equation (1) becomes as follows.

$$V1 - V2 = (R103/R104) \cdot E \quad \ldots (2)$$

According to the embodiment as mentioned above, when the adsorption control voltage E is constant, a differential voltage between the adsorption voltage V2 and the transfer voltage V1 is controlled so as to be constant irrespective of the transfer voltage V1. The voltage detecting circuit of each high voltage power source can be commonly used in a circuit for a differential voltage control and the costs of the apparatus can be reduced.

[Embodiment 14]

Figure 24:
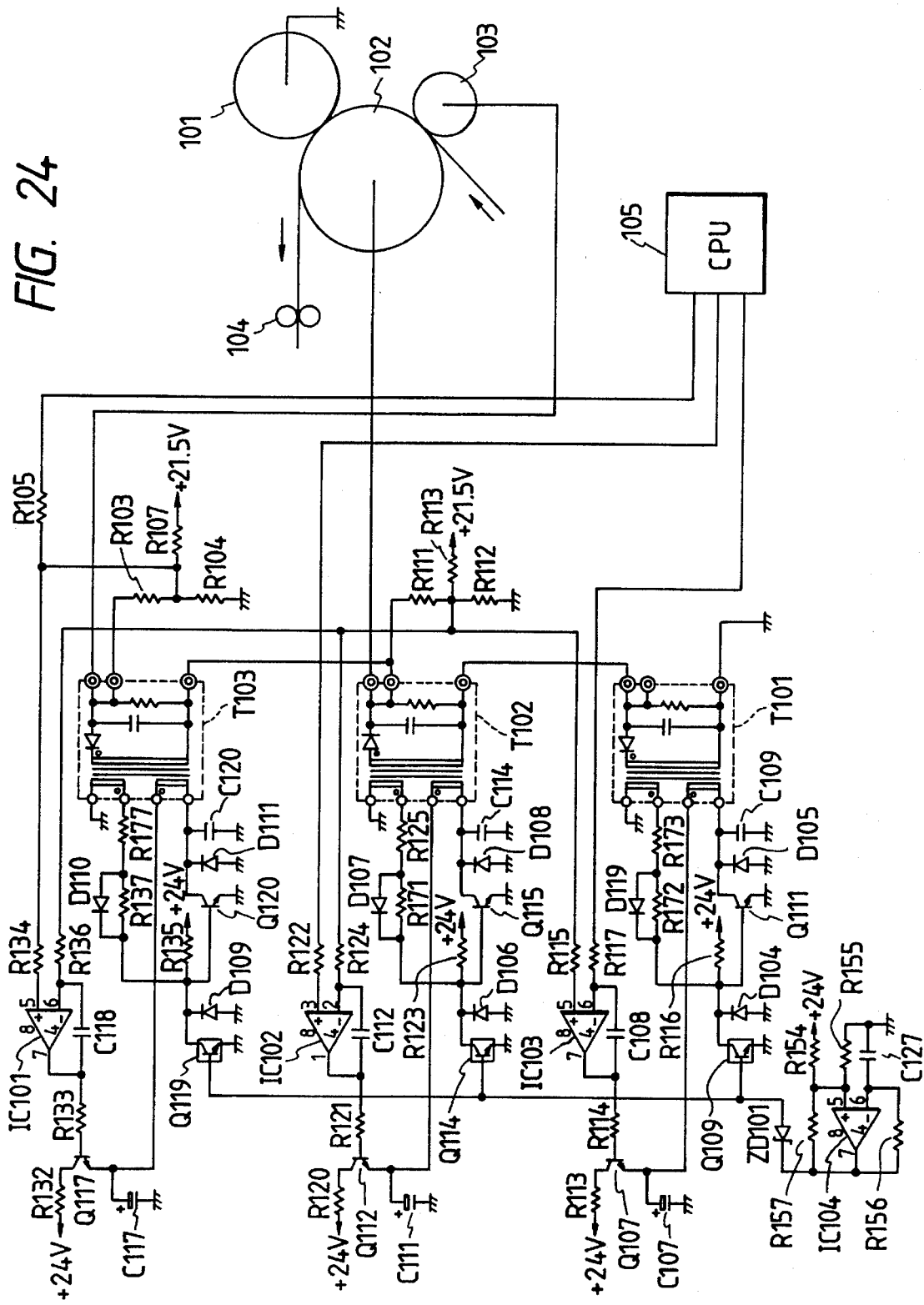
FIG. 24 is a high voltage power source circuit diagram of a copying apparatus according to an embodiment 14.

FIG. 24 is a circuit diagram of an embodiment 14. In the diagram, resistors R101, R102, and R106 divide the transfer output voltage and detects. The detection voltage is supplied to the operational amplifier IC103 through the resistor R115, to the operational amplifier IC102 through the resistor R124, and to the operational amplifier IC101 through the resistor R136, respectively. The adsorption output voltage is divided by resistors R103, R104, and R107 and detected. The detection output is supplied to another input terminal of the operational amplifier IC101 through the resistor R134. The control signal which is input from the CPU 105 is supplied to the resistor R134 through the resistor R105. The other construction is similar to that of the embodiment 13. In the diagram, when a reference voltage 21.5 V assumes (e) and the other construction is considered in a manner similar to the embodiment 13, the following equation (3) is obtained.

$$(R103 \times R104 \times R107 + R104 \times R105 \times R107 + R105 \times R103 \times R107 + R103 \times R104 \times R105) \times R102 \times R106 \times V1 - (R101 \times R102 + R102 \times R106 + R106 \times R101) \times R104 \times R105 \times R107 \times V2 = [R103 \times R104 \times R105 \times R106 \times (R101 + R102) - R101 \times R102 \times R107 \times (R103 \times R104 + R104 \times R105 + R105 \times R103)]e + (R101 + R102 + R102 \times R106 + R106 \times R101) \times R103 \times R104 \times R107 \times E \quad (3)$$

Now, assuming that R101=R103, R104=R105=2×R102, and R106=R107, the equation (3) becomes as follows.

$$V1 - V2 = (R103/R104) \cdot E \quad \ldots (4)$$

According to the embodiment as mentioned above, in a manner similar to the embodiment 13, when the adsorption control voltage E is constant, a differential voltage between the adsorption voltage V2 and the transfer voltage V1 is controlled so as to become constant irrespective of the transfer voltage V1. The number of detection resistors of the transfer output can be reduced. An increase in costs of the apparatus can be suppressed.

Although each of the above embodiments relates to the high voltage power source of the copying apparatus of the electrophotographic system, the present invention is not limited to those embodiments but can be also similarly embodied to another power source apparatus which needs a similar control.

According to the invention as described above, a power source apparatus which can accurately obtain a desired output by making a plurality of power sources operative interlockingly can be provided. In details, since both of the positive and negative DC power sources can vary the outputs, it is sufficient to set the output ranges (dynamic ranges) of both of the DC power sources to narrow values. The costs and size of the apparatus can be reduced and the reliability can be improved. The apparatus stably operates for every fluctuation of a resistive component and a voltage source component included in the load.

According to the embodiments 13 and 14, the differential voltage of both DC power sources can be accurately controlled and the output voltage detecting circuits of both DC power sources can be commonly used in the differential voltage control circuit, so that the costs and size of the apparatus can be reduced.

The present invention is not limited to the foregoing embodiments but many modifications and variations are possible within the spirit and scope of the appended claims of the invention.

What is claimed is:

1. A power source apparatus comprising:

a first DC power source which can vary a first output;

a second DC power source which can vary a second output and in which an output terminal of the same polarity as that of one output terminal of said first DC power source is connected to said one output terminal;

connecting means for connecting another output terminal of said first DC power source to one terminal of a load and connecting another output terminal of said second DC power source to another terminal of the load; and control means for making operative and controlling said first and second DC power sources in accordance with an output of said power source apparatus.

2. An apparatus according to claim 1, wherein said control means selectively drives said first and second DC power sources in accordance with said output.

3. An apparatus according to claim 1, further having detecting means for detecting an output voltage or an output current of said power source apparatus.

4. An apparatus according to claim 3, wherein said control means selectively drives said first and second DC power sources in accordance with a detection output of said detecting means.

5. An apparatus according to claim 1, further having first detecting means for detecting an output voltage of said power source apparatus and second detecting means for detecting an output current of said power source apparatus.

6. An apparatus according to claim 5, wherein said control means controls said first and second DC power sources by sequentially using outputs of said first and second detecting means.

7. A power source apparatus comprising:

a first DC power source which can vary a first output;

a second DC power source which can vary a second output and in which an output terminal of the same polarity as that of one output terminal of said first DC power source is connected to said one output terminal;

connecting means for connecting another output terminal of said first DC power source to one terminal of a load and connecting another output terminal of said second DC power source to another terminal of the load;

comparing means for comparing an output current of said power source apparatus and its reference value;

selecting and operating means for selecting and making operative one of said first and second DC power sources by setting an intermediate value of an output level of said comparing means to a threshold value; and feedback control means for supplying an output of said comparing means to the DC power source selected by said selecting and operating means, thereby executing a feedback control.

8. A power source apparatus comprising:

a first DC power source which can vary a first output;

a second DC power source which can vary a second output and in which an output terminal of the same polarity as that of one output terminal of said first DC power source is connected to said one output terminal;

connecting means for connecting another output terminal of said first DC power source to one terminal of a load and connecting another output terminal of said second DC power source to another terminal of the load;

first comparing means for comparing an output current of said power source apparatus and its reference value;

second comparing means for comparing an output voltage of the power source apparatus and its reference value;

selecting means for selecting one of said first and second comparing means;

selecting and operating means for selecting and making operative one of said first and second DC power sources by setting an intermediate value of an output level of the comparing means selected by said selecting means to a threshold value; and feedback control means for supplying an output of said comparing means selected by said selecting means to the DC power source selected by said selecting and operating means, thereby executing a feedback control.

9. An apparatus according to claim 8, wherein said selecting means has detecting means of at least one of an overvoltage and an overcurrent of the output of said power source apparatus, and a selection state is inverted by a detection output of said detecting means.

10. A power source apparatus comprising:

a first DC power source which can vary a first output;

a second DC power source which can vary a second output and in which an output terminal of the same polarity as that of one output terminal of said first DC power source is connected to said one output terminal;

connecting means for connecting another output terminal of said first DC power source to one terminal of a load and connecting another output terminal of said second DC power source to another terminal of the load; and control means for controlling an output voltage of said second DC power source on the basis of an output voltage of said first DC power source, and output voltage of said second DC power source, and a control signal in a manner such that a differential voltage between the output voltages of said first and second DC power sources is equal to a desired value.

11. A high voltage power source apparatus comprising:

positive and negative high voltage power sources which can vary outputs and in which output sides are serially connected such that both positive and negative voltages are applied to a load by synthesizing both the outputs of said positive and negative high voltage power sources;

comparing means for comparing detection values of an output voltage and an output current of said high voltage power sources and their reference values, respectively;

switching means for selecting outputs of said comparing means; and control means for storing output voltages or output currents of said high voltage power sources at predetermined timings and for setting said reference values on the basis of said stored values.

12. An apparatus according to claim 11, wherein said control means selectively making operative and controlling said positive and negative high voltage power sources by setting an intermediate value of output levels of said comparing means to a threshold value.

13. An apparatus according to claim 11, wherein said control means sequentially supplies the output voltage and output current and for sequentially executing a constant voltage control and a constant current control.

14. An apparatus according to claim 13, wherein the high voltage power source apparatus is provided in an image forming apparatus.

15. An apparatus according to claim 14, wherein an electric power is supplied from the high voltage power source apparatus to a contact type transfer brush or transfer roller of the image forming apparatus, when a toner is adsorbed from a photosensitive material to a transfer paper, a transfer drum, or a transfer belt, a constant current control is executed by a predetermined target value, an output voltage at the time of said constant current control is stored, and when the target value of said constant current control is switched, a constant voltage control by said stored output voltage is executed at an initial switching timing.

16. An apparatus according to claim 14, wherein an output of said high voltage power source apparatus is used for copy transfer and for adsorption of a transfer paper, a constant current control at the time of copy transfer and the adsorption is executed on the basis of a reference value which differs every color, and when said reference value is switched, a constant voltage control by said reference value is executed at an initial switching timing.

17. An apparatus according to claim 15, wherein at the time of the constant voltage control operation, a target value of the constant current control which is switched just after is set to a current limiter value, thereby allowing a limiter operation to be executed.

18. An apparatus according to claim 16, wherein the reference value of the constant voltage control is set to an output voltage of each of said high voltage power sources when an image is formed in a constant current mode every color.

19. An apparatus according to claim 16, wherein when the output voltage exceeds a first level at the time of the constant current control, a constant voltage control is executed by setting a second level that is lower than said first level by only a predetermined voltage to a target value for only a predetermined timing.

20. An apparatus according to claim 16, wherein the constant current control is executed at a predetermined timing after completion of the copy transfer of each color after the constant voltage control was executed by a predetermined target value.

21. An apparatus according to claim 16, wherein at the time of the constant voltage control operation, a limiter operation is executed by setting the target value of the constant current control which is switched just after the constant voltage control to a current limiter value.

22. An apparatus according to claim 20, wherein the target value of the constant voltage control is set to an output voltage of the high voltage power source at the time of the constant current control at a predetermined relevant sequence timing.

23. An image forming apparatus of an electrophotographic system having a high voltage power source apparatus of a switching type which can execute bipolarity constant voltage control and constant current control, wherein said high voltage power source apparatus comprises:

positive and negative high voltage power sources whose output sides are serially connected;

a voltage detecting circuit for dividing an output voltage which is supplied from one end of said high voltage power sources to a load by a predetermined ratio;

a first error amplifier for comparing an output of said voltage detecting circuit and a predetermined reference voltage;

a current detecting circuit inserted between the other ends of said high voltage power sources and a ground;

a second error amplifier for comparing an output of said current detecting circuit and a predetermined reference voltage;

an electronic switch for selecting outputs of said first and second error amplifiers by a control signal;

an inverting amplifier and a non-inverting amplifier for amplifying a differential voltage between an output of the error amplifier selected by said electronic switch and an intermediate value of an output level of said error amplifier;

drive circuits for controlling outputs of said positive and negative high voltage power sources in accordance with the outputs of said inverting amplifier and said non-inverting amplifier;

a comparator for comparing the output of said selected error amplifier and said intermediate value, thereby selectively making said positive and negative high voltages operative;

an A/D converter for converting an analog output signal of said voltage detecting circuit into a digital signal;

a microcomputer for storing an output signal of said A/D converter and for producing reference signals for said first and second error amplifiers at predetermined sequence timings; and a D/A converter for converting said digital reference signals into the analog signals and for giving to said first and second error amplifiers as said reference voltages.

* * * * *